(12) United States Patent
Enis et al.

(10) Patent No.: US 8,833,083 B2
(45) Date of Patent: Sep. 16, 2014

(54) METHOD AND APPARATUS FOR USING COMPRESSED AIR TO INCREASE THE EFFICIENCY OF A FUEL DRIVEN TURBINE GENERATOR

(76) Inventors: Ben M. Enis, Henderson, NV (US);
Paul Lieberman, Torrance, CA (US)

( * ) Notice: Subject to any disclaimer, the term of this patent is extended or adjusted under 35 U.S.C. 154(b) by 404 days.

(21) Appl. No.: 12/587,340

(22) Filed: Oct. 6, 2009

(65) Prior Publication Data
US 2010/0095681 A1    Apr. 22, 2010

Related U.S. Application Data

(60) Provisional application No. 61/195,418, filed on Oct. 7, 2008.

(51) Int. Cl.
*F02C 1/00*    (2006.01)

(52) U.S. Cl.
USPC ............................................................. 60/728

(58) Field of Classification Search
CPC ............ F02C 7/05; F02C 7/143; Y02E 20/14
USPC ........................ 60/728, 39.182, 39.093, 792; 165/104.19
See application file for complete search history.

(56) References Cited

U.S. PATENT DOCUMENTS

| | | | |
|---|---|---|---|
| 1,970,437 A | 8/1934 | Snitkin | |
| 1,999,712 A | 4/1935 | Zorn et al. | |
| 3,251,192 A | 5/1966 | Rich et al. | |
| 3,314,881 A | 4/1967 | Tuwiner | |
| 3,342,039 A | 9/1967 | Bridge et al. | |
| 3,356,591 A | 12/1967 | Peterson | |
| 3,443,393 A | 5/1969 | Goldberg | |
| 3,543,534 A * | 12/1970 | Mary et al. ....................... | 62/310 |
| 3,796,045 A * | 3/1974 | Foster-Pegg ..................... | 60/772 |
| 4,323,424 A | 4/1982 | Secunda et al. | |
| 4,328,666 A * | 5/1982 | Cummins, Jr. ............. | 60/39.093 |
| 4,749,394 A | 6/1988 | Ehrsam | |
| 4,838,039 A | 6/1989 | Knodel | |
| 5,193,352 A * | 3/1993 | Smith et al. ....................... | 62/90 |
| 5,207,928 A | 5/1993 | Lerner | |
| 5,400,619 A | 3/1995 | Husseiny et al. | |
| 5,444,971 A * | 8/1995 | Holenberger ................... | 60/783 |
| 5,632,148 A * | 5/1997 | Bronicki et al. ................ | 60/728 |
| 5,758,502 A * | 6/1998 | Utamura et al. ................ | 60/728 |
| 5,782,093 A * | 7/1998 | Yamashita et al. ............. | 60/728 |
| 6,119,445 A * | 9/2000 | Bronicki et al. ................ | 60/772 |

(Continued)

OTHER PUBLICATIONS

Gajjar, Chaker, Dighe, Meher-Homji; "Inlet fogging for a 655 MW combined cycle power plant-design . . . "; Proceedings of ASME Turbo Expo 2003, Jun. 16-19, 2003, Atlanta, Georgia.

(Continued)

*Primary Examiner* — Phutthiwat Wongwian
(74) *Attorney, Agent, or Firm* — J. John Shimazaki

(57) ABSTRACT

An apparatus for increasing the efficiency of a fuel driven turbine generator, including a system comprising a turbo compressor and turbo expander that produces super chilled air mixed with ambient air to produce relatively cool dry inlet air that can be introduced under pressure into the generator. A separation compartment with a passageway extending normal to the travel direction of the chilled air is used to remove ice particles and particulates from the cool inlet air to avoid damage to the turbine blades. Additional apparatuses such as heat exchangers and steam driven turbine generators and chillers, as well as thermal energy storage systems, are contemplated.

10 Claims, 18 Drawing Sheets

(56) References Cited

U.S. PATENT DOCUMENTS

| | | | |
|---|---|---|---|
| 6,233,917 B1 * | 5/2001 | Bahr et al. | 60/39.093 |
| 6,299,735 B1 | 10/2001 | Lumbreras | |
| 6,318,065 B1 * | 11/2001 | Pierson | 60/783 |
| 6,318,089 B1 * | 11/2001 | Hiraga et al. | 60/728 |
| 6,374,591 B1 * | 4/2002 | Johnson et al. | 60/783 |
| 6,739,119 B2 * | 5/2004 | Erickson | 60/39.53 |
| 7,178,348 B2 * | 2/2007 | Stuhlmueller | 62/115 |
| 2002/0066265 A1 * | 6/2002 | Tsuji | 60/39.182 |

OTHER PUBLICATIONS

Mohanty, Palosao; "Enhancing gas turbine performance by intake air cooling . . . "; Heat Recovery Systems & CHP, vol. 15, No. 1, pp. 41-50, 1995.

Kakaras, Doukelis, Karellas; "Compressor intake-air cooling in gas turbine plants."; Science Direct, Energy 29 (2004) 2347-2358.

* cited by examiner

| STATE | PRESSURE (PSIA) | TEMPERATURE (F) | ENTHALPY (BTU/#) | THERMODYNAMIC EFFICIENCY (%) | ENTROPY (BTU/(#F)) | WORK TO SHAFT (BTU/#) |
|---|---|---|---|---|---|---|
| 1 | 14.67 | 70 | 126.71 | | 1.6366 | |
| 2a | 90 | 426.44 | 213.05 | | 1.6366 | |
| Q1 | | | | 85 | | |
| 2b | 90 | 373.77 | 200.1 | | 1.6215 | |
| Q2 | | | | | | |
| 3 | 90 | 70 | 126.18 | | 1.5113 | |
| 4 | 215 | 272 | 174.8425 | | 1.5408 | |
| Q3 | | | | | | |
| 5 | 215 | 70 | 125.32 | | 1.4501 | |
| 6a | 14.67 | -215.41 | 57.967 | | 1.4501 | |
| Q4 | | | | | | |
| 6b | 14.67 | -173.67 | 68.07 | 85 | 1.4883 | |
| W1 | | | | | | 57.25 |

| STATE | PRESSURE (PSIA) | TEMP (F) | DENSITY (LB/CU FT) | ENTHALPY (BTU/LB) | ENTROPY (BTU/(LB R) | EFFICIENCY | |
|---|---|---|---|---|---|---|---|
| 1 | 14.67 | 70 | 0.074764 | 126.71 | 1.6366 | | |
| | 90 | 426.44 | 0.27351 | 213.05 | 1.6366 | | |
| | | | | 73.389 | | 85% | HEAT TRANSFERRED FROM WATER COOLANT |
| | | | | 12.951 | | | |
| | | | | 200.099 | | | HEAT TRANSFERRED BY COOLING COMPRESSOR AIR OUTPUT |
| 2 | 90 | 373.77 | 0.29085 | 200.1 | 1.6215 | | |
| Q1 | | | | 73.92 | | | |
| 3 | 90 | 70 | 0.45949 | 126.18 | 1.5113 | | HEAT TRANSFERRED FROM WATER COOLANT |
| | 123 | 119.73 | 0.57343 | 138.06 | 1.5113 | | |
| | | | | 10.098 | | 85% | |
| | | | | 136.278 | | | HEAT TRANSFERRED FROM TURBOCOMPRESSOR HEAT EXCHANGER |
| 4 | 123 | 112.42 | 0.58089 | 136.28 | 1.5082 | | |
| Q2 | | | | 10.33 | | | |
| 5 | 123 | 70 | 0.62843 | 125.95 | 1.4895 | | HEAT TRANSFERRED FROM WATER COOLANT |
| | 215 | 162.29 | 0.93249 | 147.97 | 1.4895 | | |
| | | | | 18.717 | | 85% | |
| | | | | 144.667 | | | HEAT TRANSFERRED FROM TURBOCOMPRESSOR HEAT EXCHANGER |
| 6 | 215 | 148.83 | 0.95363 | 144.67 | 1.4841 | | |
| Q3 | | | | 19.35 | | | |
| 7 | 215 | 70 | 1.1005 | 125.32 | 1.4501 | | HEAT TRANSFERRED FROM WATER COOLANT |
| | 55 | -102.29 | 0.41916 | 84.676 | 1.4501 | | |
| | | | | -34.5474 | | | |
| | | | | 90.7726 | | | |
| | | | | 6.0966 | | | |

FIG. 12B

| | | | | | | |
|---|---|---|---|---|---|---|
| 8 | 55 | -77.246 | 0.39089 | 90.773 | 1.4666 | |
| | 14.67 | -198.21 | 0.15245 | 62.137 | 1.4666 | |
| | | | | -24.3406 | | 85% |
| | | | | 66.4324 | | |
| | | | | 4.2954 | | |
| 9 | 14.67 | -180.45 | 0.14258 | 66.432 | 1.4825 | |

HEAT TRANSFERRED FROM WATER COOLANT

| | | | | | | |
|---|---|---|---|---|---|---|
| 8' | 55 | -77.246 | 0.39089 | 90.773 | 1.4666 | |
| | 20 | -173.84 | 0.19017 | 67.912 | 1.4666 | |
| | | | | -19.43185 | | 85% |
| | | | | 71.34115 | | |
| | | | | 3.42915 | | |
| 9' | 20 | -159.67 | 0.181 | 71.341 | 1.4783 | |

HEAT TRANSFERRED FROM WATER COOLANT

*FIG. 12B Continued*

```
            50.6 #/SEC FLOW THROUGH CTT
            BTU#    BTU/SEC    KW
INPUT       73.389  3,713.5    3,917.7   TOTAL

RECOVERED   13.0    655.3      691.4         TITAN 130 PERFORMANCE
            73.9    3,740.4    3,946.1          11,000 @ 113 DEG F
            10.1    511.0      539.1            17,600 @ -22 DEG F
            10.3    522.7      551.4
            18.7    947.1      999.2
            19.4    979.1      1,033.0
             6.1    308.5      325.5
             4.3    217.3      229.3
                               8,314.8   TOTAL
TITAN 130 ENHANCEMENT          6,600     TOTAL   TITAN 130 ENHANCEMENT
                               14,914.8  GRAND TOTAL

OUTPUT/INPUT =         3.81
```

FIG. 14

Titan 130 Airflow 50.6    #/sec    dry air 59.1    #/sec    ambient air 0.0245   # water/# air at 113 deg F and 40% RH 1.44795   # water/sec

40   F

32   F

1   BTU/(# F)

144   BTU/#

220.1   BTU/SEC 232.2   KW

FIG. 15

METHOD AND APPARATUS FOR USING COMPRESSED AIR TO INCREASE THE EFFICIENCY OF A FUEL DRIVEN TURBINE GENERATOR

RELATED APPLICATIONS

This application claims the benefit of the filing date of U.S. Provisional Application Ser. No. 61/195,418, filed on Oct. 7, 2008.

FIELD OF THE INVENTION

The invention relates to a method and apparatus for increasing the efficiency of a fuel driven turbine generator, and in particular, to a system comprising a turbo compressor and turbo expander device that produces super chilled air that can be mixed with ambient air to produce relatively cool dry inlet air that can be introduced under pressure into the fuel driven generator to increase the efficiency thereof. Additional efficiency increasing apparatuses such as steam driven turbine generators and/or chillers that use the heat produced by air compression to enhance performance, as well as thermal energy storage systems that store the chilled water produced as the compressed air is expanded are contemplated.

BACKGROUND OF THE INVENTION

Fuel driven turbine based power generators and plants have been in existence for many years. They generally comprise a means of burning a mixture of air and fuel vapor within a combustion chamber to drive an expansion turbine which in turn drives an electrical generator that produces electricity. An upstream compressor turbine is typically used to draw in ambient air and increase its pressure prior to being introduced into the combustion chamber, wherein the pressurized ambient air is combined with high pressure fuel vapor and ignited in the combustion chamber to drive an expansion turbine which in turn drives an electric generator to produce electricity.

Another common feature of conventional fuel driven turbine generators is that the compressor turbine, expansion turbine and electric generator are typically located on the same shaft so that if one rotates the others rotate as well. In such case, initiating the operation of the system can be accomplished by rotating the compressor turbine which in turn causes the expansion turbine and generator to rotate as well. That is, as the compressor turbine begins to rotate and causes the ambient air to be compressed and introduced into the combustion chamber, the energy created as the fuel vapor is burned within the combustion chamber can help drive the expansion turbine which in turn continues to drive the compressor turbine. Because the compressor turbine, expansion turbine, and electrical generator are located on the same shaft, by using the energy produced by the combustion chamber to drive the expansion turbine, all three components can be driven until a steady state condition of operation is achieved.

As a result of this configuration, however, a downside is that nearly two thirds of the energy produced by the system is typically used to drive the compressor turbine, such that only about one third of the total energy output is available to drive the electrical generator to produce electricity. That is, a majority of the work performed by the system is essentially recycled and reused to drive the compressor turbine, wherein less work becomes available to drive the electrical generator, which makes the system inefficient.

Another drawback to this type of system is that when the ambient temperature of the inlet air increases, the air becomes less dense, and therefore, more energy is needed to drive the compressor turbine—to compress the same amount of air and perform the same amount of work. And when the amount of work needed to drive the compressor turbine is increased, this additional energy is taken away from the output, wherein less energy becomes available to drive the electrical generator, which in turn, results in less energy being produced for the same amount of fuel that is consumed.

For this reason, many attempts have been made in the past to reduce the temperature of the inlet air introduced into the compressor turbine which has the effect of increasing the density of the air and the efficiency of the fuel driven turbine generator. At lower intake temperatures, air drawn by the compressor turbine is denser and therefore has greater mass flow and thus less energy is required to enable the compressor turbine to perform its work, and, as a result, more energy becomes available to drive the electrical generator and generate electricity. That is, a greater portion of the energy produced by the system can be used to drive the electrical generator and thereby produce electricity. Note that the compressor turbine consumes energy on the basis of the volumetric flow that it pressurizes, so when the cold air is denser, it passes on more compressed air mass to the combustion chamber for the same amount of expended work or compressor turbine energy.

For these reasons, various technologies have been devised and developed in the past to cool the inlet air before it is introduced into the compressor turbine. The most common commercially available coolers are: 1) evaporative coolers, 2) fogging coolers, 3) high pressure fogging coolers, 4) wet compression coolers, 5) mechanical chillers, 6) absorption chillers, and 7) liquid air coolers.

The downside to these cooling systems is that many of them have specific disadvantages that make them ill suited for widespread application in connection with this technology. For example, fogging and evaporative coolers typically only bring the inlet air temperature down from the dry bulb temperature (Tdb) to the wet bulb temperature (Tw), and at 100% relative humidity, these values can equal each other (Tdb=Tw), wherein no cooling is then possible. Even if the relative humidity is lower, such as down to about 40%, the maximum temperature drop is still only Tdb−Tw, or about 15 to 25 degrees F. In such case, if the ambient air temperature is relatively high, such as 100 degrees F. or higher, the lowest temperature that can be achieved may be about 75 degrees to 85 degrees F. For these reasons, despite their lower installation costs, fogging coolers, evaporative coolers and wet compression coolers are typically ill suited for use in many applications, including those in various areas of the world such as in hot humid climate regions.

Mechanical and absorptive coolers are also expensive to install and operate, and have a high cost of maintenance, wherein these costs can significantly reduce the cost savings that could otherwise be achieved by reducing the inlet air temperature to increase efficiencies of the system. Another disadvantage of these conventional cooling systems is that they typically use chemical refrigerants such as ammonia, lithium bromide and Freon which can represent an environmental hazard. It should be noted that each chilling system may have a different fluid in the primary heat exchanger coil, as well as in the secondary heat exchanger coil, and different compressors that create different initial costs, maintenance costs and environmentally permitted fluid disposal costs. The lithium bromide system also involves the maintenance of a vacuum.

Another significant disadvantage is that these past cooling systems when used in connection with conventional fuel driven turbine generators typically cannot be used to reduce the inlet air temperature to below freezing. This is because when there is any moisture in the ambient air, ice particles can form that can damage the turbine blades and reduce the efficiency of the system. Typically, the entrance into the combustion chamber of the gas turbine set is in the shape of a nozzle or nacelle and the compressor turbine blades are located a short distance downstream, wherein the inlet cross-sectional area of the nacelle is often larger than the downstream cross sectional area of the nozzle, so that there is an isentropic acceleration of the air speed along with an associated temperature decrease. Accordingly, an associated problem that can occur when reducing the temperature of the inlet air in this manner is that the constriction of the air flow path inside the nacelle of the compressor turbine can cause the air inside to become overcooled, i.e., colder than it should be. Although lower inlet air temperatures can result in greater system efficiencies, as discussed above, the downside is that if the temperature of the inlet air is reduced below freezing, ice particles can begin to form, wherein not only can the ice particles lead to a reduction in power output, but in many cases, they can strike the high speed turbine blades as the air is being accelerated into the gas turbine which can cause pitting and damage thereto.

In this respect, it has been established mathematically and empirically that the drawn-in air can be cooled by up to about 9 to 10 degrees F. or more during acceleration of the inlet air into the compressor turbine, which is based on an air velocity of up to 300 feet per second or more traveling through the nacelle. In such case, even if the initial inlet air temperature is carefully set to a few degrees above freezing, when the air accelerates through the nacelle and becomes colder, ice particles can begin to form that can damage the turbine blades. Accordingly, in order to avoid damage to the turbine blades, and maintain system efficiency, the initial inlet air into the compressor turbine typically must be higher than about 42 degrees F., especially whenever there is any moisture in the air. The result has been that the system was limited to having the inlet air temperature reduced to only a minimum of about 42 degrees F., which limited the extent to which the system efficiencies could be improved.

In order to avoid the formation of ice particles within the intake air of the fuel driven turbine generator, it has been a normal practice to warm the intake air before entering into the compressor turbine, notwithstanding that there has been an effort to reduce the temperature thereof. In such case, additional heating or anti-icing devices have been employed, such as, for example, a system that feeds re-circulated hot compressor air into the intake air using a steam-heated heat exchanger or even using an electric heating system. The down-side to using such systems is that additional energy is consumed to power the heating system. Moreover, by increasing the temperature of the inlet air, notwithstanding the desire to reduce the temperature thereof, additional inefficiencies are introduced thereby.

Because of the above disadvantages, another associated problem with existing cooling systems of this kind is that each one is limited in its operating regime so that a single system is not normally suitable for widespread application. For example, fogging, high pressure fogging, wet compression fogging and evaporative coolers are typically not useful in relatively hot humid climates because they can't reduce the temperature of the inlet air low enough. Likewise, mechanical and absorptive chillers may be too expensive to install and operate and can produce environmental concerns that may not justify the improved efficiencies they provide. And, most importantly, past cooling systems suffer from being limited in their ability to reduce the temperature of the inlet air to below about 42 degrees F., such as when there is any moisture in the air, which is almost all of the time.

Accordingly, what is needed is an alternative system capable of increasing the efficiencies of a fuel driven turbine generator set without causing additional system inefficiencies to occur.

SUMMARY OF THE INVENTION

The present invention relates to an improvement over previous fuel driven turbine generators, wherein the system preferably uses a means of generating super chilled air using a turbo compressor and turbo expander device to produce cool dry inlet air that can be injected into the compressor turbine for more efficient operation thereof. Unlike previous devices for cooling the inlet air, however, the present invention preferably utilizes compressed air released and expanded by a turbo compressor and turbo expander device to generate super chilled air, wherein the system produces not only cool inlet air that can be drawn into the fuel driven turbine generator, but cool "dry" inlet air which will not damage the turbine blades. Unlike previous systems, the moisture from the inlet air is preferably removed from the ambient air using a centrifuge so that as the inlet air is accelerated through the nacelle and into the compressor turbine, no ice particles that can damage the turbine blades are formed.

One advantage of the present system is that it utilizes a combination compressor, turbo compressor and turbo expander device (hereinafter "CTT device") that compresses air under pressure and then releases it to produce super chilled air. The CTT device, as it is so called, preferably has a first compressor that at startup begins to compress and drive the air to cause the turbo expander to begin rotating, and then, because the turbo expander and turbo compressor are located on a common shaft, rotating the turbo expander will cause the turbo compressor to rotate as well. After a few seconds, a steady state condition of operation is achieved, wherein the turbo compressor continues to compress the air, and the turbo expander continues to expand the air, and the end result is that super chilled air is produced thereby.

The super chilled air produced by the CTT device can then be mixed with ambient air to produce a relatively cool inlet air for introduction into the compressor turbine of the fuel driven turbine generator. But in such case, a mixing compartment or eductor is preferably provided in which the chilled air is mixed with the ambient air, wherein the super chilled air is preferably introduced through an opening into the eductor from the CTT device, and the warmer ambient air is introduced through one or more additional openings, wherein the velocity of the super chilled air can help draw the ambient air through the openings and into the eductor. Then, as the two air masses are mixed together, what emerges is a relatively cool dry mass flow of air that can be used as the inlet air to increase the efficiency of the fuel driven turbine generator.

As discussed above, an advantage of producing cool air and using it as the inlet air in the compressor turbine is that the cool air is denser, and has greater mass flow, and therefore, the compressor turbine doesn't have to work as hard to compress an equivalent volume of inlet air into the combustion chamber. Accordingly, the compressor turbine ends up consuming less energy to compress the ambient air, wherein more energy can then become available to drive the electric generator, i.e., a greater portion of the energy produced by the system is used to drive the electric generator and produce electricity. What results is that less energy is used to operate the compressor turbine, which advantageously means that more energy is available to drive the electric generator, which helps to increase the ability of the system to produce more electricity per unit volume of fuel consumed.

Another advantage of the present system is that the super chilled air produced by the CTT device can be used to remove the moisture from the inlet air and avoid the creation of ice particles that can otherwise damage the turbine blades. This is accomplished by using the super chilled air as a means of flash freezing water vapor within the ambient air and then separating the ice particles (including the solid particulates trapped within the ice particles) from the chilled air. That is, as the warm ambient air is mixed with the super chilled air, most of the water vapor in the ambient air can be flash frozen to form tiny ice particles. Then, as the ice particles fall to the bottom of a separation compartment (or centrifuge), the cool dry air can preferably be directed into a side duct or passageway that extends at about ninety degrees relative to the axis of the centrifuge, wherein as the high speed ice particles continue on their straight inertial trajectory to the bottom, the cool dry air can turn the corner and pass through the passageway and leave the ice particles behind. The result is that cool "dry" air is produced which can be introduced into the gas turbine generator.

As discussed, the elimination of ice particles from the cool inlet air not only increases the efficiency of the system but also avoids pitting and causing damage to the turbine blades. The entrance into the compressor turbine of the fuel driven turbine generator is typically in the shape of a nozzle or nacelle, with a relatively wide opening followed by a relatively narrow nacelle where the compressor turbine blades are located. Accordingly, as the inlet air is accelerated through the nacelle, an approximately adiabatic acceleration of the drawn-in air can result from a constriction of the flow path, wherein this condition is associated with an enthalpy reduction, which in turn, can produce a significantly greater temperature drop. Although lower inlet air temperatures result in greater system efficiencies, the downside is that if the temperature of the inlet air is reduced too much, i.e., to below freezing, ice particles can form that can strike the turbine blades and cause damage thereto.

One of the advantages of the present CTT device, as discussed above, is that the inlet air temperature can be reduced to well below freezing without the risk of forming ice particles that can otherwise cause damage to the turbine blades. Rather, the temperature of the cool dry inlet air can be reduced to below freezing, which means that the temperature of the inlet air can be significantly colder than in past systems, and therefore, the system can be more efficient than past systems. Moreover, no additional heating systems are required to prevent ice particles from forming, which in previous attempts reduced the amount of energy that could be produced. Another advantage is that no chemical refrigerants are used—the present invention only uses air.

In another embodiment, the chilled water produced as the ice particles melt in the centrifuge can be used to provide cooling for ancillary devices. That is, as the ice particles are collected at the bottom of the centrifuge, they can be thawed to produce chilled water that can be transferred to an associated device such as a thermal energy storage system wherein the chilled water can be stored for later use. The thermal energy storage system preferably comprises a stratification tank in which the chilled water can be stored, and from which the chilled water can be removed to provide cooling for ancillary devices, such as HVAC, refrigeration, desalination or the like, etc. After the chilled water is used to provide the necessary cooling for these devices, the water can be recycled back into the stratification tank, wherein by storing the chilled water in this fashion, water can be made available when it is needed—on demand.

In an alternate embodiment, the chilled water can be used directly to provide cooling for HVAC, refrigeration, desalination or the like, etc., without storing it first.

Heat exchangers can be used to draw the heat produced by the CTT device away and transferred to a steam turbine generator system and/or chiller system associated therewith to enhance the performance thereof. The heat exchangers preferably comprise a coolant, such as water, that can be channeled through the compressor units to transfer heat away from the CTT device to an associated steam turbine generator device and/or chiller system.

For the steam generator, pre-heated water can be made available for the associated boiler so that the water in the boiler can be brought to boiling using less additional energy. By withdrawing the heat from the CTT device, and preheating the coolant water, and introducing the coolant water into the boiler, not only is the steam turbine generator made more efficient, but the entire system can be made more efficient in producing electricity. The steam driven turbine generator can be any conventional type that uses a boiler to create steam, which in turn, drives a steam turbine wherein an electrical generator can be driven to produce electricity.

In the case of absorption chillers, a thermo chemical compressor can be used to take advantage of the fact that some chemicals tend to dissolve into other chemicals—wherein a refrigerant can be dissolved into an absorbent solution for which it has a high affinity. The refrigerant can then change phase and circulate through the entire system, wherein an electric pump is preferably provided to move the absorbent solution into a generator section, wherein heat from the CTT device can be applied to drive the refrigerant vapor out of the solution and into the evaporator to provide cooling where needed. In this case, the heat used is derived from the heat generated by the CTT device heat exchangers.

Additional advantages and improvements can be gleaned from the following description of the drawings and detailed description of the invention.

DESCRIPTION OF THE DRAWINGS

FIG. 12B is a state properties chart for the CTT device shown in FIG. 12A;

FIG. 14 is a chart showing the power output to input ratios based on the example shown in FIGS. 12B and 13;

FIG. 15 is a chart showing the net power effect of the TES system receiving thawed water;

DETAILED DESCRIPTION OF THE INVENTION

Figure 1:
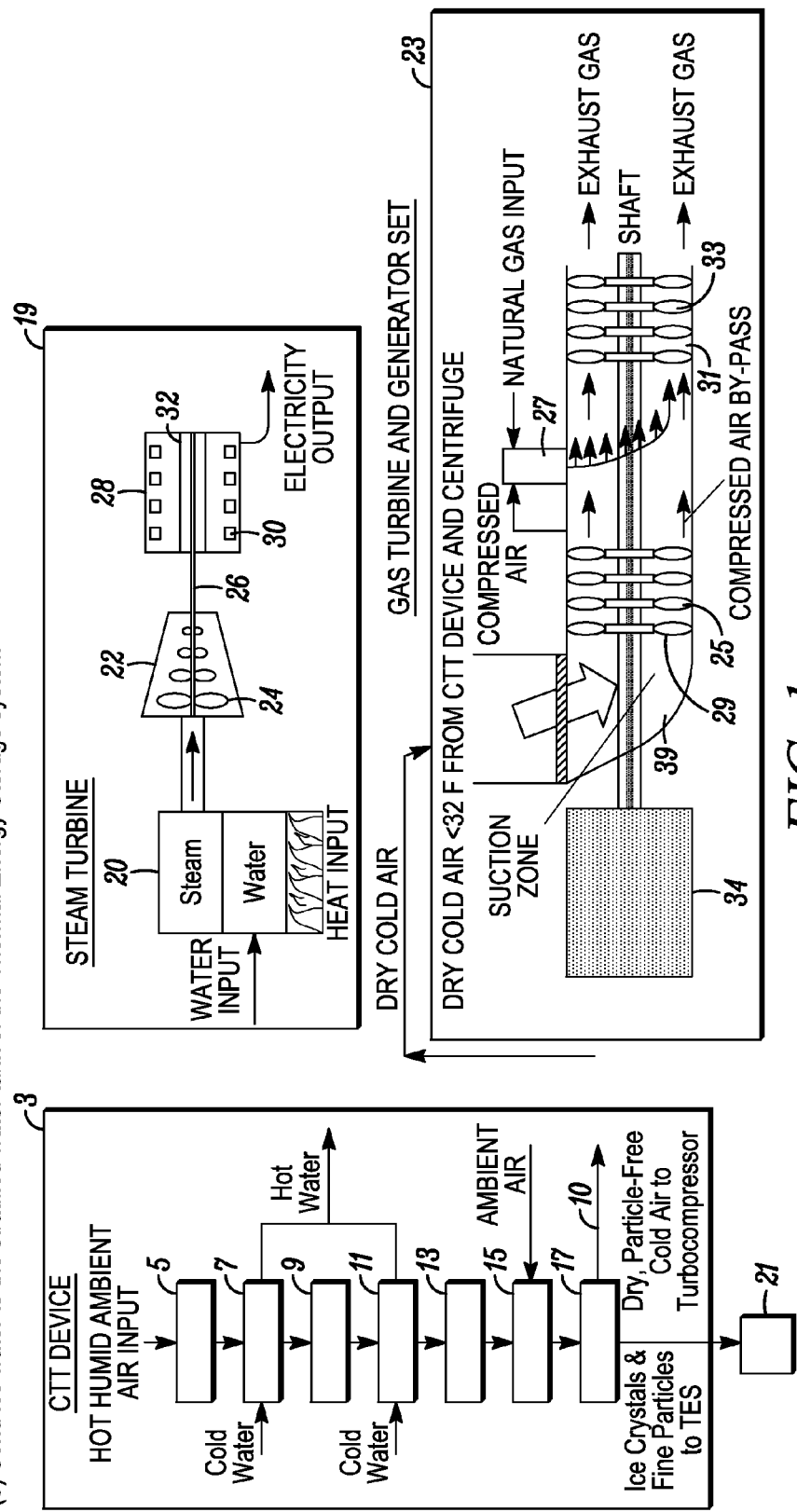
FIG. 1 is a schematic drawing showing the various components and method steps for increasing the efficiency of a fuel driven turbine generator, including the CTT device, the steam turbine generator, and the fuel driven turbine generator set.
Figure 4:
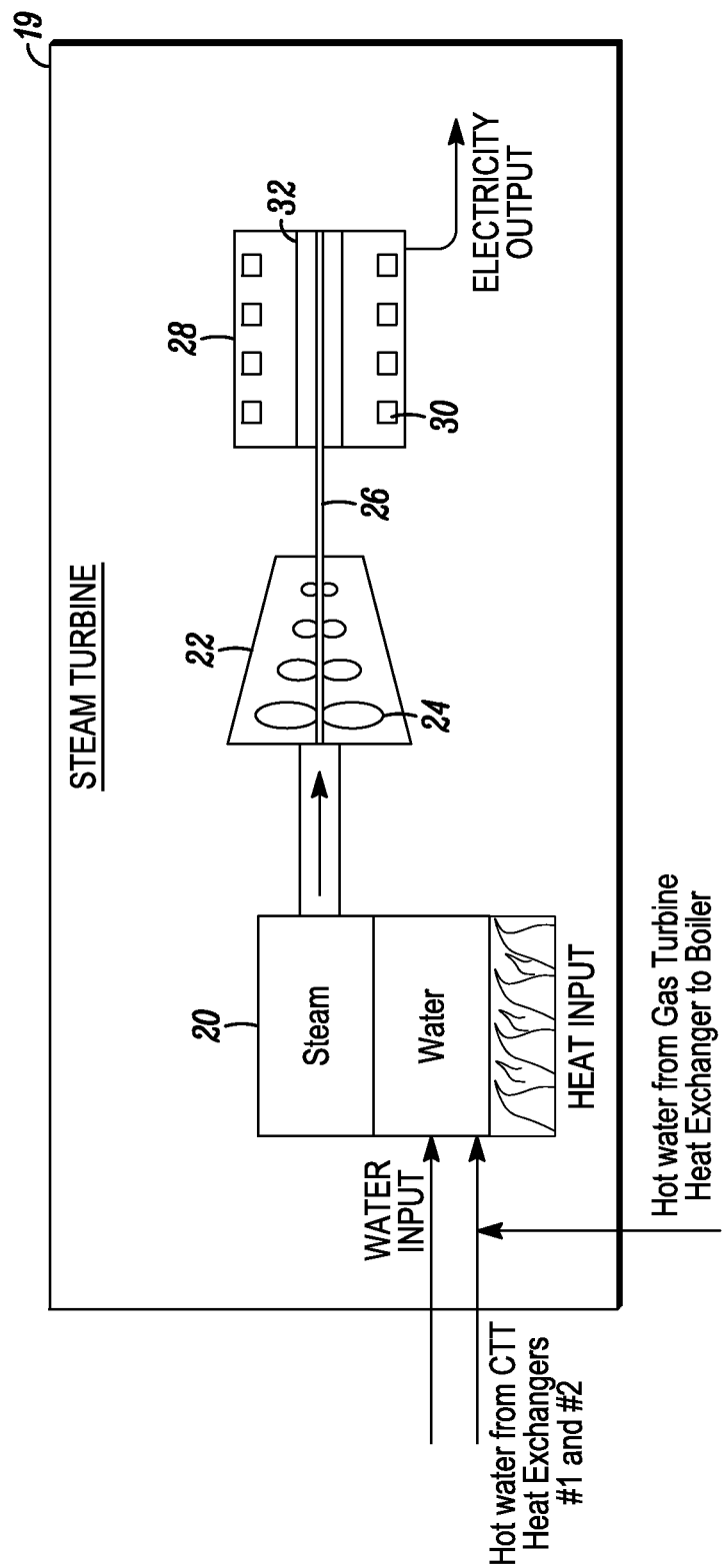
FIG. 4 is a schematic drawing showing various components of the steam turbine generator system that utilizes the heated coolant provided by the CTT device as the preheated water for the steam boiler, wherein the system can generate electricity using the steam turbine and generator more efficiently.
Figure 9:
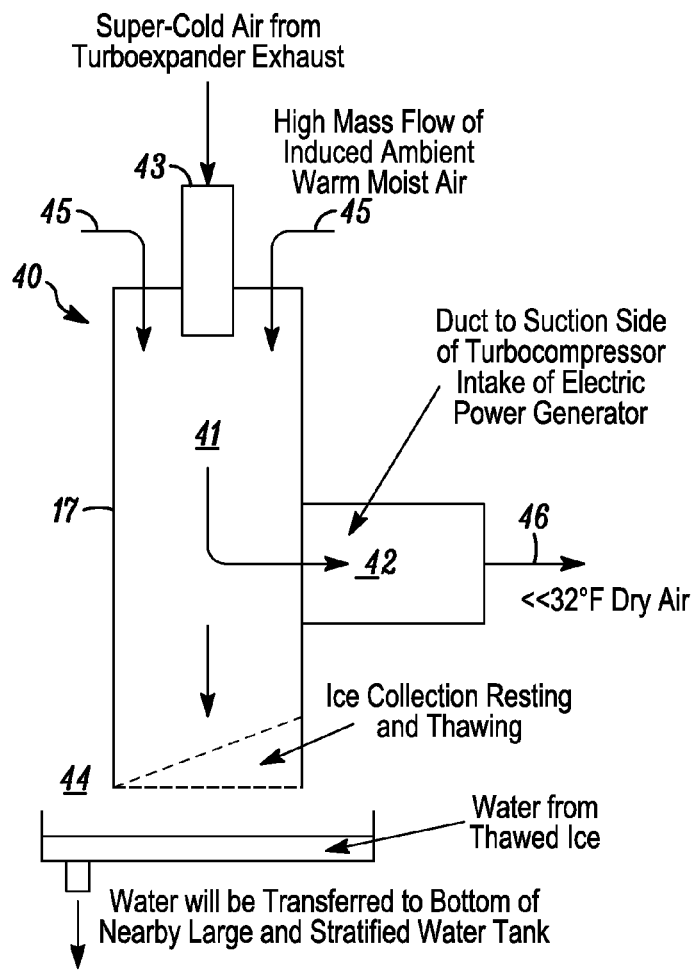
FIG. 9 is a schematic drawing showing various components of the separation compartment (centrifuge) that can be used to flash freeze the water vapor contained in the ambient air using super chilled air from the CTT device, wherein as the vapor freezes to produce ice particles, the high speed ice particles are allowed to fall to the bottom of the centrifuge by virtue of the inertia thereof, and the cool air is directed through a passageway or side duct extending substantially normal to the compartment, wherein the ice particles can be removed from the chilled air to produce cool "dry" air.
Figure 10:
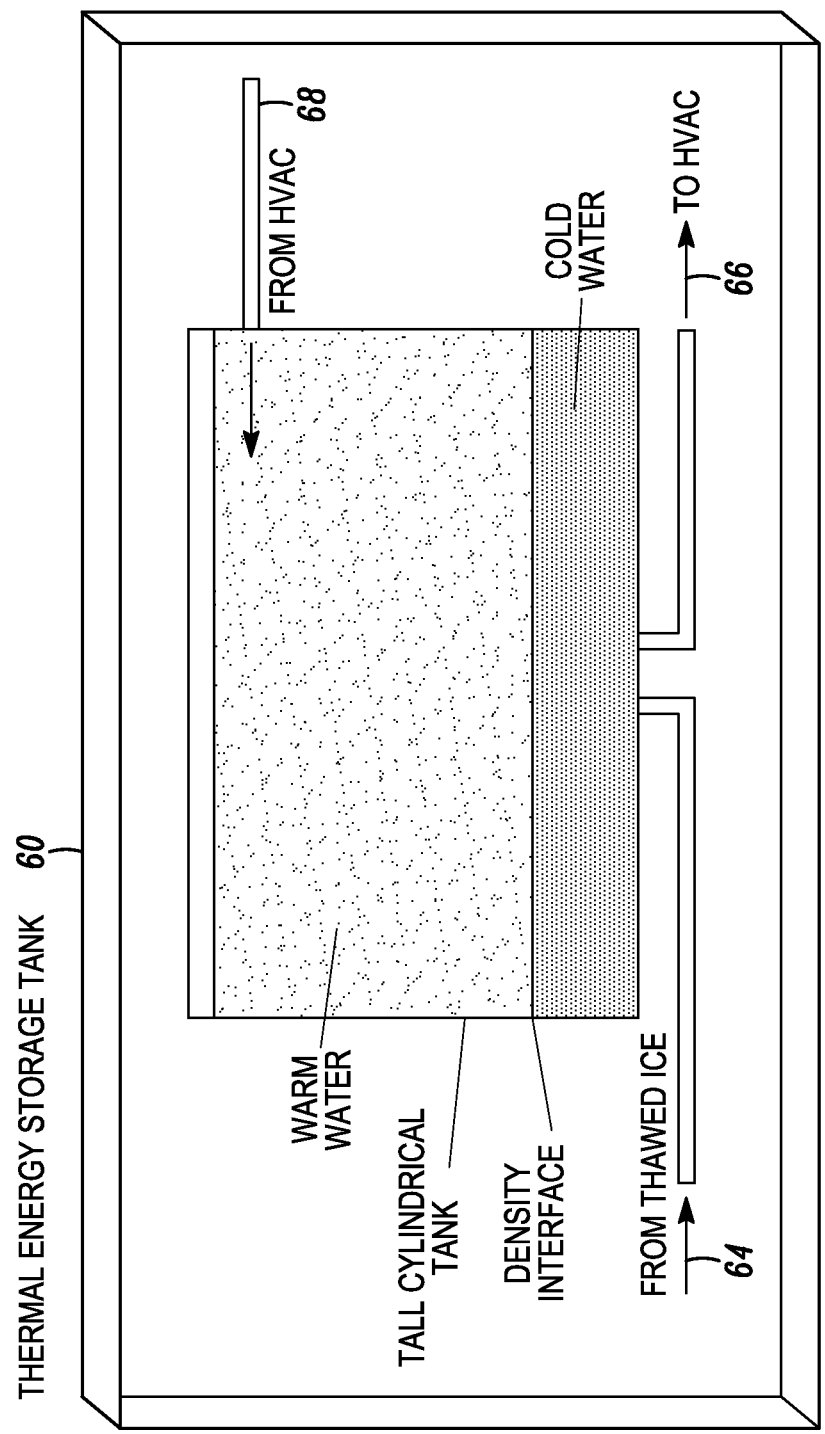
FIG. 10 is a schematic drawing showing various components of the thermal energy storage system, and more specifically, the "stratification" tank that can be used to store cold water formed as the ice particles are allowed to melt in the centrifuge, wherein the cold water can be stored and used to provide cooling for HVAC, refrigeration, desalination or the like, etc., and the warm water from the heat exchangers can be stored at the top of the thermal energy storage tank.

FIG. 1 shows various components of system 1. The following is a summary of the components which will be described in more detail later:

1) CTT Device: A compressor, turbo compressor and turbo expander device 3 (referred to as CTT device 3) preferably has a compressor 5 (1, 2 or 3 stage), turbo compressor 9 (1 or 2 stage), and turbo expander 13 (1 or 2 stage), and one or more heat exchangers, such as heat exchanger no. 1, 7, and heat exchanger no. 2, 11, one downstream of each compressor 5, 9, a mixing compartment (eductor) 15, a separation compartment (centrifuge) 17, and thermal energy storage system (TES) 21. CTT device 3 preferably produces super-chilled air that can be mixed with warm ambient air within eductor 15, wherein, ice particles that are formed can be deposited at the bottom of centrifuge 17, whereas, the resultant cool dry air can be separated from the ice particles by being routed through a horizontal passageway or duct 42 extending substantially normal to the vertical axis of centrifuge 17 as shown in FIG. 9. Heat exchangers 7 and 11 can be used to draw heat away from CTT device 3 and used in an ancillary generator, such as steam turbine generator 19 or chiller 130;

2) Steam Generator: FIG. 4 shows a steam turbine generator 19 comprising a boiler 20, steam turbine 22, turbine blades 24, shaft 26, magnet 32 attached to shaft 26, coil 30, and generator 28, wherein boiler 20 utilizes preheated coolant water expelled from CTT device 3 to produce steam for turbine 22. This can be any conventional steam turbine generator, wherein the preheated coolant helps to enable steam to be produced more efficiently, which in turn, enables steam turbine generator 19 to generate electricity more efficiently;

3) TES: A thermal energy storage system 21 ("TES") for storing chilled water expelled from CTT device 3 wherein the water can be stored in a stratification tank 60 as shown in FIG. 10 and used for purposes of providing cooling for HVAC, refrigeration, desalination or the like, etc.;

4) Fuel/Gen set: A fuel driven turbine generator set 23 preferably has a compressor turbine 25, combustion chamber 27, expansion turbine 33 and electrical power generator 34 capable of using the cool dry air generated by CTT device 3 which is used as the inlet air into suction zone 39 toward blades 29 of compressor turbine 25. Compressor turbine 25 is preferably adapted to compress the cool dry inlet air into combustion chamber 27, wherein a fuel vapor is preferably introduced into chamber 27 and mixed with the compressed air such that the mixture can be burned and combusted to drive expansion turbine 33. Because expansion turbine 33 is located on the same drive shaft as electrical power generator 34, rotating expansion turbine 33 will cause generator 34 to rotate and produce electricity, and because compressor turbine 25 is also located on the same shaft, all three components can rotate together and reach a steady state condition of operation wherein all three components can be driven by expansion turbine 33.

Figure 17:
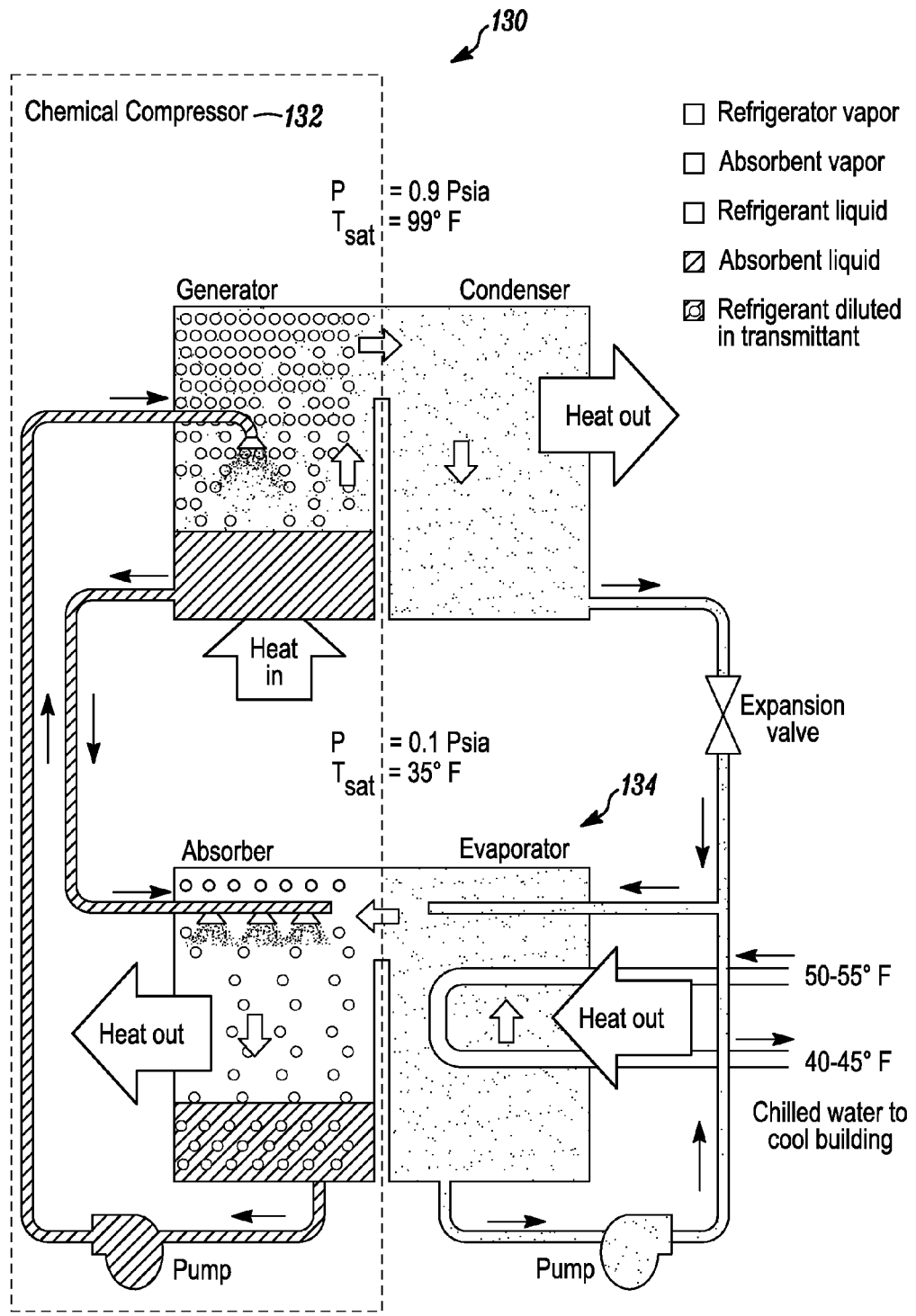
FIG. 17 is a chart showing how an absorption chiller works.

A chiller system 130 as shown in FIG. 17 can also utilize heat from preheated coolant water expelled from CTT device 3 to drive a refrigerant vapor into an evaporator 134. In the case of absorption chillers, rather than using a mechanical compressor to drive a vapor compression cycle, absorption chillers 130 can use a thermochemical compressor 132, wherein the refrigerant dissolves into an absorbent solution (for which it has a high affinity), and the refrigerant changes phase and circulates through the entire system. An electric pump is preferably provided to move the absorbent solution into a generator section, wherein heat can be applied (from CTT device 3) to drive the refrigerant vapor out of the solution and into evaporator 134.

Each component of system 1 will now be discussed in more detail.

Figure 2:
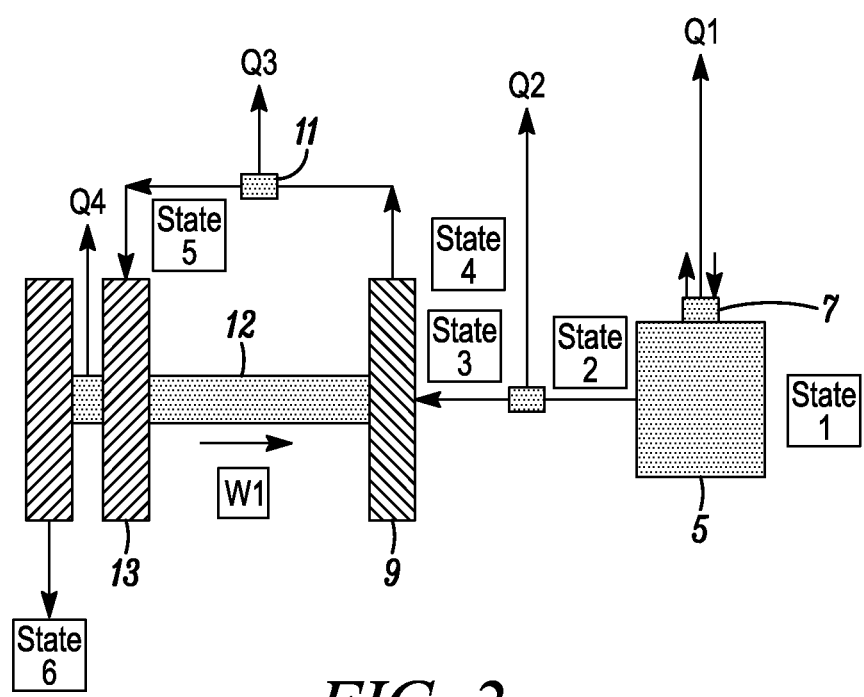
FIG. 2 is a schematic drawing showing an embodiment of the CTT device with the compressor, turbo compressor and turbo expander for generating super chilled air, wherein the turbo compressor and turbo expander are located on a common shaft and two heat exchangers for removing heat from the compressors are provided.
Figure 3:
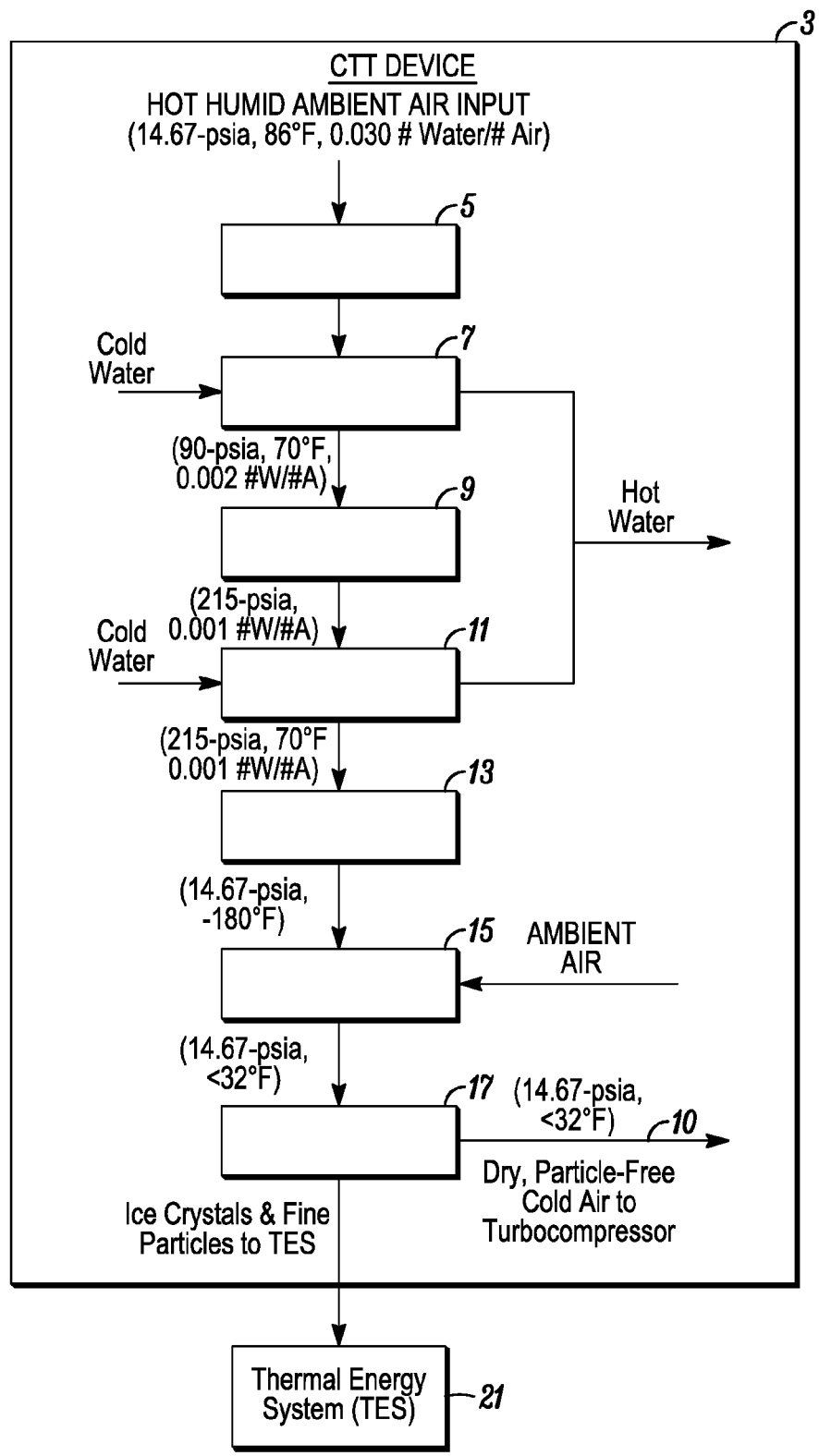
FIG. 3 is a schematic drawing showing the various components and method steps of an embodiment of the CTT device, including the compressor, turbo compressor and turbo expander, as well as two heat exchangers, mixing compartment (eductor), separation compartment (centrifuge), and associated thermal energy storage system.

1. CTT Device (Including Eductor and Centrifuge):

FIG. 3 shows an embodiment of CTT device 3 that couples compressor 5 with turbo compressor 9 and turbo expander 13. The basic operation of CTT device 3 is shown schematically in FIG. 2. The operation of CTT device 3 starts with compressor 5 which initially pressurizes the ambient input air, such as to a standard level of about 90-psia, preferably using a separate power source. Compressor 5 preferably compresses the ambient air which is then introduced into turbo compressor 9, and as this occurs, because turbo compressor 9 and turbo expander 13 are located on the same shaft, they will both begin to rotate. A common shaft 12 ("free spindle") that extends between turbo compressor 9 and turbo expander 13 enables the torque (mechanical work) generated by turbo expander 13 to drive turbo compressor 9 until a steady state condition of operation is achieved. The rotational speed of shaft 12 produced by turbo expander 13 preferably provides sufficient power to drive turbo compressor 9 until it reaches an equilibrium input pressure. When the steady state condition of operation is achieved, i.e., within a few seconds, turbo compressor 9 continues to compress the air compressed by compressor 5. Thereafter, the compressed air enters into turbo expander 13 such that it can be released to produce super chilled air.

CTT device 3 preferably has heat exchangers 7, 11 that help to reduce the temperature of the compressed air as it is being compressed by compressor 5 and turbo compressor 9, respectively. This way, the heat generated by the compressors can be expelled so the heat does not affect or offset the temperature of the chilled air being generated and introduced into fuel driven generator set 23.

In this respect, first heat exchanger 7 is preferably any conventional type such as a counter flow type that uses a coolant, such as water, to draw heat away from compressor 5 (and the compressed air that it produces), wherein once heat is exchanged, the coolant is transferred to an associated generator such as steam turbine generator 19 and/or absorption chiller 130. First heat exchanger 7 preferably forces the high temperature compressed air produced by compressor 5 to surrender the heat contained therein to the coolant, wherein as the coolant is heated, the temperature of the compressed air produced by compressor 5 can be substantially reduced.

Second heat exchanger 11 is preferably provided to help remove heat from turbo compressor 9, wherein heat exchanger 11 operates in substantially the same manner as first heat exchanger 7. Second heat exchanger 11 is preferably any conventional type that uses a coolant to draw heat away from turbo compressor 9 (and the compressed air that it produces), wherein once heat is exchanged, the coolant is transferred to an associated generator such as steam turbine generator 19 and/or absorption chiller 130.

Figure 3A:
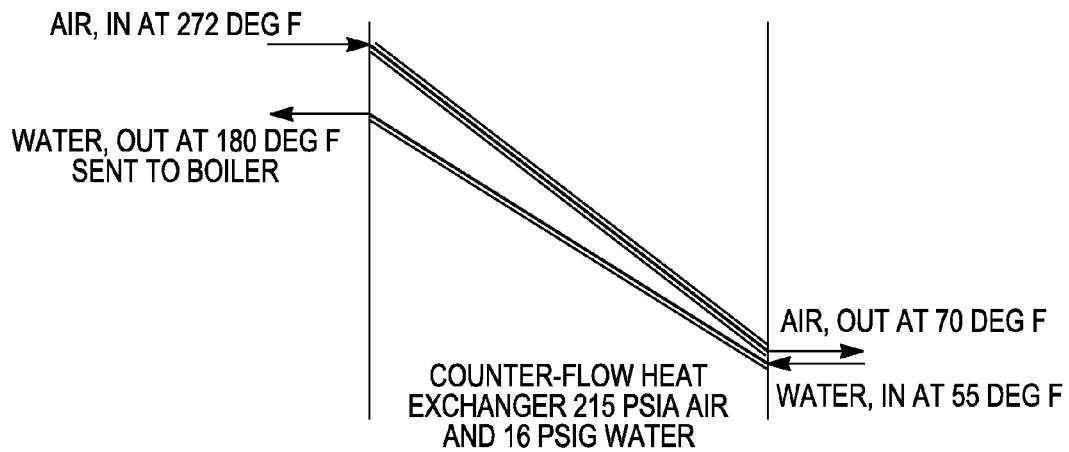
FIG. 3A is a chart showing an example of the temperature changes that can occur as a result of using the heat exchangers in connection with the CTT device.
Figure 3B:
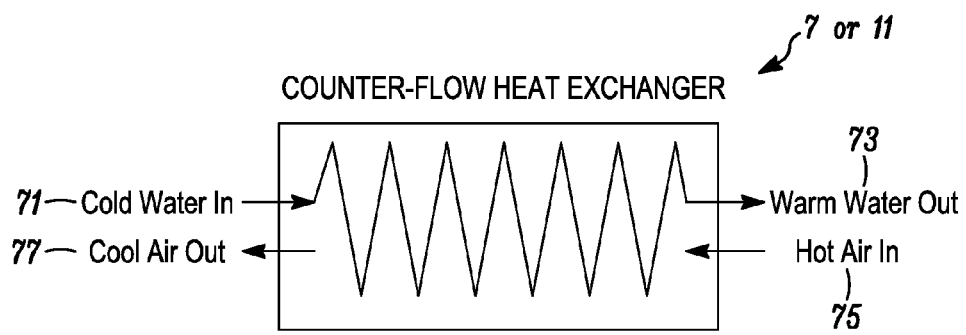
FIG. 3B is a schematic drawing showing the internal workings of a counter flow heat exchanger contemplated for use in connection with the CTT device.

Preferably, heat exchangers 7 and 11 are counter flow heat exchangers as shown in FIG. 3b. In such case, the coolant water is preferably introduced into heat exchanger 7 or 11 at entry point 71, and the heated coolant water is allowed to exit through exit point 73 at the opposite end thereof. On the other hand, the compressed air produced by compressor 5 and/or turbo compressor 9, as the case may be, is preferably introduced in the opposite direction, wherein the heated compressed air preferably enters heat exchanger 7 or 11 at entry point 75, and the cooled heated air exits through exit point 77. This way, the heated air is introduced into the same end where the heated water exits, while at the same time, the relatively cold water is introduced into the same end 71 where the cool air exits 77. This helps to enable heat exchangers 7, 11 to be operated more efficiently.

As the air is compressed by compressor 5, and heated, heat exchanger 7 can draw the heat away, and reduce the temperature thereof, while at the same time, the pressure can be increased. For example, the air can be heated to 450 degrees F., and heat exchanger 7 can lower the temperature of the air down to 70 degrees F., wherein the air pressure can be increased to about 90 psia. When the air is compressed again by turbo compressor 9, and heated, heat exchanger 11 can likewise draw the heat away, and reduce the temperature thereof, while at the same time, the pressure can be increased further. For example, the air can be heated to 270 degrees F., and heat exchanger 11 can lower the temperature down to 70 degrees F., wherein the pressure can be increased to about 215 psia.

This is diagrammatically shown in FIG. 3A, wherein the heated compressed air begins at a relatively high temperature (shown for example as 272 degrees F.), but exits the heat exchanger at a relatively low temperature (shown as 70 degrees F.). Likewise, the coolant water preferably enters the heat exchanger at a relatively low temperature (shown as 55 degrees F.), and exits at a relatively high temperature (shown as 180 degrees F.). The heated water can then be transferred to boiler 20 of steam turbine generator 19 and used to produce steam more efficiently. A typical compressor is only 75% efficient, so by using heat exchangers to recapture and use some of the heat generated thereby, some of the 25% loss in energy can be recouped.

All of the temperatures and pressure values discussed herein and shown in the drawings are approximate, and in each case, it can be seen that other than the freezing temperature which cannot be altered, the other values are solely for exemplary purposes, and therefore, should not be construed as limiting, but rather, it should be understood and recognized that higher or lower values can be contemplated.

Additional heat exchangers for turbo expander 13 can also be provided which can draw away the heat generated by friction caused by the turbo expanders as they spin. Although the bearings are designed to produce little friction, a typical turbo expander can rotate at 30,000 RPM, and therefore, heat can be generated that may require heat exchange to cool the bearings. Turbo expanders are typically only 85% efficient, so by using heat exchangers to utilize some of the heat they generate, some of the 15% loss in energy can be recouped.

Heat exchangers 7, 11 preferably help to maintain the compressed air at room temperature, i.e., at about 70 degrees F., while the preferred final pressure is about 215 psia or more. This compressed air can then be released and expanded by turbo expander 13 which causes the pressure of the compressed air to drop, such as down to 14.67 psia. It also causes the temperature of the air to drop substantially, such as from room temperature down to minus 150 degrees F. to minus 200 degrees F. or more. This significant drop in temperature is partly due to the energy losses attributed to having the heat drawn by heat exchangers 7, 11, and the energy used when turbo expander 13 drives turbo compressor 9 on the same shaft. The principal purpose of CTT device 3 is to reduce the temperature of the inlet air from ambient temperature down to minus 150 degrees F. to minus 200 degrees F. or more, wherein this super chilled air can then be mixed with ambient air to produce relatively cool dry air for introduction into compressor turbine 25.

Figures 6, 7:
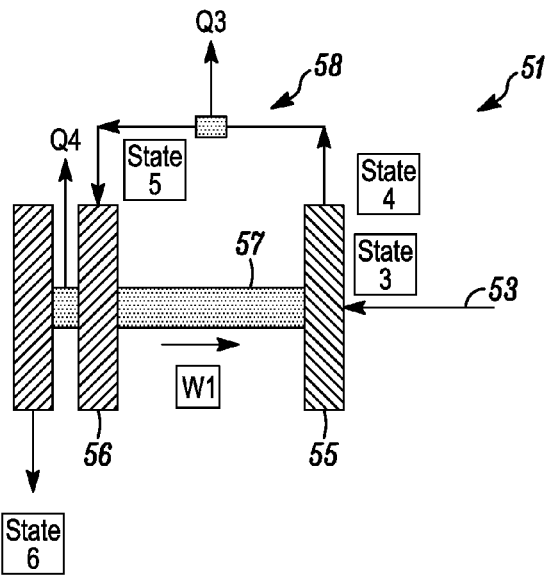
FIG. 6 is a schematic drawing showing an alternate embodiment of the turbo compressor and two-stage turbo expander device for generating chilled air that utilizes an existing source of compressed air wherein a common shaft extends between the turbo compressor and turbo expander and at least one heat exchanger is provided for removing heat from the turbo compressor.
FIG. 7 is a chart showing temperatures and pressures for a sample system, including the state properties of the air in FIGS. 2 and/or 6.

In another embodiment 51, as shown in FIG. 6, which can be used in cases where there is an existing source 53 of compressed air available, a separate compressor 5 is not necessary. In the proposed application 51, the compressor 5 that would have initiated the operation of CTT device 3 is not used, but rather, this embodiment contemplates that compressed air can be provided by an existing source 53 available at the site. Thus the system would only need a water cooled free-spindle turbo compressor 55 and turbo expander 56 (TT device 51) rather than a full CTT device, but like CTT device 3, this version preferably has a common shaft 57 that extends between turbo compressor 55 and turbo expander 56, such that they can achieve a steady state condition of operation over time. It also preferably has at least one heat exchanger 58 to help transfer heat away from turbo compressor 55 (and the compressed air that it produces). Again, the heat generated by turbo compressor 55 can be transferred, for example, to a coolant, as discussed above, and then transferred to an associated device such as steam turbine generator 19 or chiller 130.

FIG. 7 shows an example of possible computed air properties at each point in the air flow path for both CTT device 3 and TT device 51. Note that states 1 and 2 only apply to CTT device 3, and not to TT device 51, because states 1 and 2 refer to properties created by compressor 5, which TT device 51 does not have. In the case of TT device 51 the initial air pressure used to drive turbo compressor 55 can be provided by an existing source 53 of compressed air instead of compressor 5. Thus, with TT device 51, the system starts with compressed air entering into turbo compressor 55 at state 3, which in the example has an air pressure of about 90-psia, and an air temperature of about 70 degrees F. The other conditions set forth in FIG. 7 beginning with state 3 are applicable to both CTT device 3 and TT device 51.

Note that in either case, pressure ratios less than 8 can typically be handled by a single stage turbo expander. But in many applications, where larger pressure ratios, such as 15 are used, a two stage turbo expander may be needed.

Figure 12A:
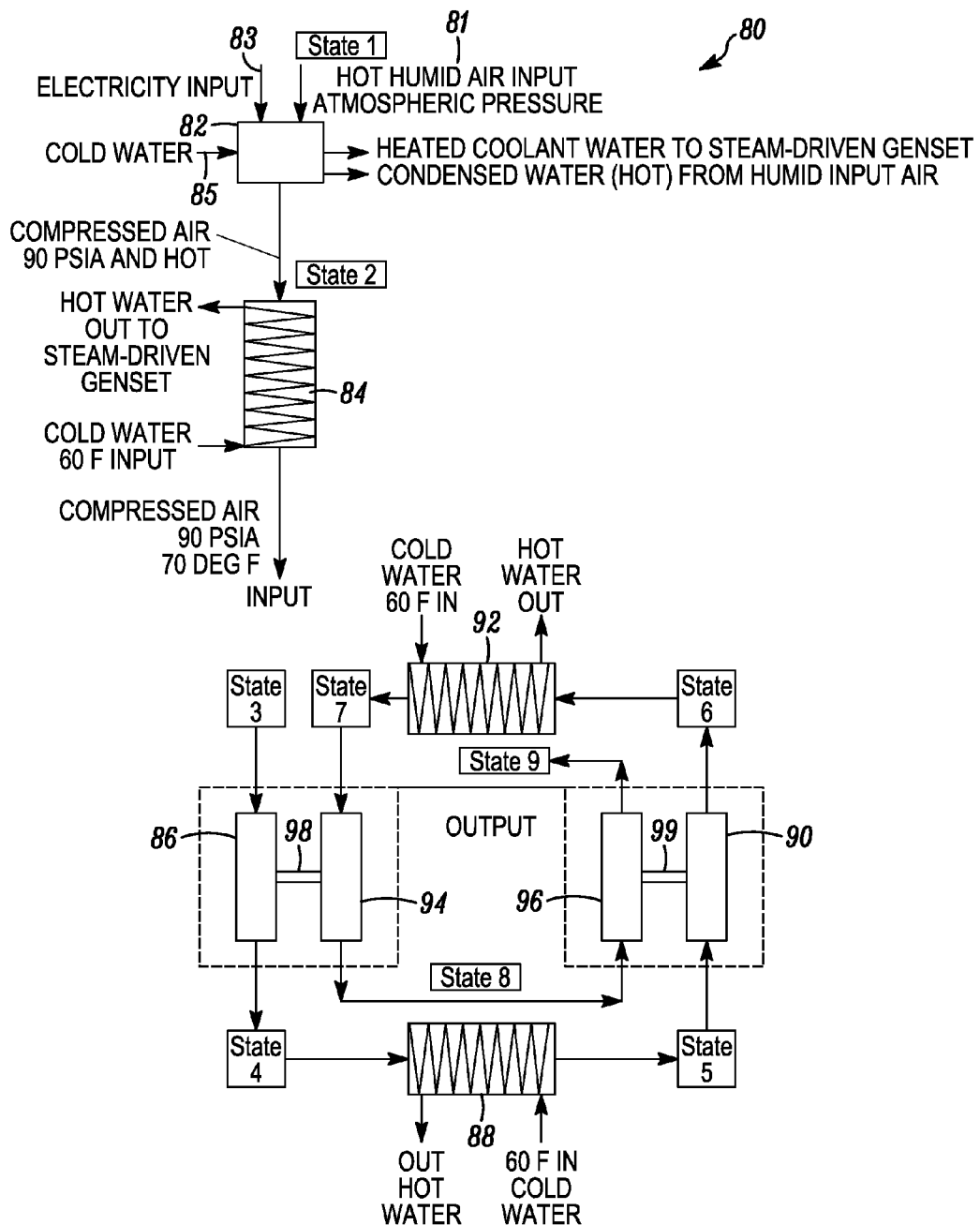
FIG. 12A is a schematic drawing showing an alternate embodiment of the CTT device for generating chilled air that utilizes a two stage turbo compressor and two stage turbo expander set with a two stage compressor, wherein the turbo compressor and turbo expander sets are located on a common shaft, and multiple heat exchangers for removing heat from the compressors are provided.

FIG. 12A shows a two stage turbo expander CTT device 80 that has a two stage compressor 82, a two stage turbo compressor 86, 90, and a two stage turbo expander 94, 96, along with various heat exchangers, such as 84, 88, 92. It can be seen that the ambient air is first acted upon by compressor 82, wherein a first heat exchanger 84 reduces the temperature of the heated air. The compressed air is then acted upon by first turbo compressor 86 which compresses the air further, wherein a second heat exchanger 88 reduces the temperature of the heated air again. The air that has been compressed further is then acted upon by second turbo compressor 90 which compresses the air again, wherein a third heat exchanger 92 reduces the temperature of the air again. These are followed by first and second turbo expanders 94, 96 which expand and release the compressed air to produce super chilled air.

Accordingly, ambient air is preferably introduced at ambient temperature and ambient pressure (as shown by 81 at state 1) into compressor 82. Electricity input 83 is preferably provided to drive compressor 82 which begins to compress the ambient air, which increases the temperature of the compressed air. At this point, the resultant pressure can be 90 psia, and the temperature can be 426 degrees F., as shown in FIG. 12B. However, because compressor 82 is not fully efficient, i.e., it is typically only 85% efficient, the compressed air it produces does not achieve a maximum temperature, i.e., for example, the air may only be 373 degrees F. or less. In this respect, the waste heat (of this temperature drop) is preferably absorbed by the material comprising compressor 82 and therefore a water coolant 85 is preferably circulated through compressor 82 to draw the heat away. This 15% of input power is then preferably transferred by the water coolant to either steam driven generator 19 or the input of an available nearby chiller 130. The pounds per hour of air processed when multiplied by 213.1−200.1=13 BTU/LB air results in the maximum value of the recovered value of waste power.

The compressed heated air that exits compressor 82 is then preferably passed through first heat exchanger 84 (as shown by state 2), wherein the temperature of the compressed air can be reduced. First heat exchanger 84 can be any conventional type such as the counter flow type described above. It preferably draws heat away from the compressed air, wherein once the heat is exchanged, the coolant can be transferred to an associated steam turbine generator 19 and/or absorption chiller 130. First heat exchanger 84 preferably forces the high temperature compressed air produced by compressor 5 to surrender the heat contained therein to the coolant, wherein as the coolant is heated, the temperature of the compressed air can be substantially reduced.

At this point, the goal of heat exchanger 84 is to reduce the temperature of the compressed air to about room temperature before it is passed onto first stage turbo compressor 86 (see state 3). For example, if the air exiting compressor 82 is at 373 degrees F., first heat exchanger 84 preferably reduces the temperature of the air down to about 70 degrees F., prior to its entry into first stage turbo compressor 86. Although the pressure of the compressed air preferably remains about the same, i.e., about 90 psia, some small pressure drops may be experienced by the air flow through the interior of first heat exchanger 84. The pounds per hour of air processed when multiplied by Q1=73.9 BTU/LB air preferably results in the maximum value of the recovered value power from first heat exchanger 84 downstream of compressor 82.

The compressed air from first heat exchanger 84 is preferably introduced into first stage turbo compressor 86 (as shown by state 3), wherein the air is compressed further. For example, at this point, the air is preferably compressed from 90 psia to about 123 psia, which also increases the temperature of the air, such as from 70 degrees F. to about 120 degrees F., as shown in FIG. 12B. However, because turbo compressor 86 is not fully efficient, the compressed air does not achieve a maximum temperature. For example, there may be losses, such as 10.1 BTU/LB (as shown in FIG. 12B between states 3 and 4), wherein the output temperature may be 112 degrees F. instead. In this respect, the waste heat of this temperature drop may be absorbed by the material comprising the compressor 86 and therefore water coolant may need to be circulated through turbo compressor 86. The coolant water from turbo compressor 86 is preferably fed to either steam driven generator 19 or to a nearby chiller 130 for power recovery to deliver 10.1 BTU/LB air.

The compressed air that exits turbo compressor 86 is then preferably passed through second heat exchanger 88 (as shown by state 4), wherein the temperature of the compressed air is reduced. Second heat exchanger 88 can be any conventional type such as the counter flow type described above. It preferably draws heat away from the compressed air, wherein once the heat is exchanged, the coolant is preferably transferred to an associated steam turbine generator 19 or chiller 130, and the temperature of the compressed air can be substantially reduced, such as back down to room temperature. The pounds per hour of air processed when multiplied by Q2=10.22 BTU/LB air preferably results in the maximum value of the recovered value power from second heat exchanger 88 downstream from first stage turbo compressor 86.

At this point, the goal of second heat exchanger 88 is to reduce the temperature of the compressed air to about room temperature before it is passed onto second stage turbo compressor 90. For example, if the air exiting turbo compressor 86 is at 112 degrees F., second heat exchanger 88 preferably reduces the temperature of the air down to about 70 degrees F., prior to entering into second stage turbo compressor 90. Although the pressure of the compressed air preferably remains about the same, such as 123 psia, some minimal pressure drop may be caused by the air flow through the interior of second heat exchanger 88.

Next, the compressed air that exits second heat exchanger 88 is preferably introduced into second stage turbo compressor 90 (as shown by state 5), wherein the air is compressed further. For example, at this point, the air is preferably compressed from about 123 psia to about 215 psia, which also increases the temperature of the air, such as from 70 degrees F. to about 162 degrees F., as shown in FIG. 12B. However, because turbo compressor 90 is not fully efficient, the compressed air does not achieve maximum temperature. For example, there may be losses, such as 18.7 BTU/LB (as shown in FIG. 12B between states 5 and 6), wherein the output temperature may be more like 148 degrees F. In this respect, the waste heat of this temperature drop may be absorbed by the material comprising the turbo compressor 90 and therefore water coolant should be circulated through turbo compressor 90 as well. The coolant water from turbo compressor 90 is preferably fed to either steam driven generator 19 or to a nearby chiller 130 for power recovery to deliver 18.7 BTU/LB air.

The compressed air that exits second stage turbo compressor 90 is then preferably passed through third heat exchanger 92 (as shown by state 6), wherein the temperature of the compressed heated air is reduced. Third heat exchanger 92 can be any conventional type such as the counter flow type described above. It preferably draws the heat away from the compressed air, wherein once heat is exchanged, the coolant is transferred to an associated steam turbine generator 19 or chiller 130, and the temperature of the compressed air can be substantially reduced. The pounds per hour of air processed when multiplied by Q3=19.35 BTU/LB air preferably results in the maximum value of the recovered value power from third heat exchanger 92 downstream from second stage turbo compressor 90.

The compressed air that exits third heat exchanger 92 is then preferably introduced into first stage turbo expander 94 (as shown by state 7), wherein the compressed air is released and expanded. For example, at this point, the air which has been compressed to about 215 psia can be released until the pressure is reduced to 55 psia, wherein the temperature can reach minus 102 degrees F., as shown in FIG. 12B. However, due to losses between states 7 and 8, as shown in FIG. 12B, such as 90.77−84.67=6.1 BTU/LB, the actual output temperature may be more like minus 77 degrees F. The coolant water from first stage turbo expander 94 is preferably fed to either steam driven generator 19 or to a nearby chiller 130 for power recovery to deliver 18.7 BTU/LB air.

The air that exits first stage turbo expander 94 is then preferably introduced into second stage turbo expander 96 (as shown by state 8), wherein the air is released and expanded again. For example, at this point, the air which was at 55 psia can be released until the pressure is reduced down to 14.67 psia, and the temperature which was at minus 102 degrees F. can be reduced to minus 198 degrees F., as shown in FIG. 12B. However, due to losses between states 8 and 9, as shown in FIG. 12B, such as 66.43−62.14=4.3 BTU/LB, the actual output temperature may be more like minus 180 degrees F. The heated coolant water from second stage turbo expander 96 is preferably fed to either steam driven generator 19 or a nearby chiller 130 for power recovery to deliver 4.3 BTU/LB air.

Notwithstanding the above, the bottom portion of FIG. 12B considers the possibility that the outlet pressure may be more like 20 psia instead of 14.67 psia in order for the flow to have sufficient energy to pass through downstream hardware where there is no suction at its final station. In this case, the reduced expansion may result in a higher final temperature, such as minus 159 degrees F., rather than minus 180 degrees F.

It should be noted that as compressor 82 is operated and works to compress the ambient air, and air is passed through the system as described above, and as turbo expanders 94 and 96 begin to spin and operate to release the compressed air, additional work is performed which eventually results in the system reaching a steady state condition of operation. The basic operation of device 80 starts with compressed air from compressor 82 being introduced into first stage turbo compressor 86, and then into second stage turbo compressor 90, and by the time the compressed air is released, because turbo expander 94 and turbo compressor 86 located on the same shaft, and turbo expander 96 and turbo compressor 90 are located on the same shaft, when turbo expanders 94, 96 begin to rotate, turbo compressors 86, 90 also begin to rotate. As this occurs, all four begin rotating. A common shaft 98, 99 ("free spindle") that extends between turbo compressors 86, 90 and turbo expanders 94, 96, respectively, enables the torque (mechanical work) generated by turbo expanders 94, 96 to drive turbo compressors 86, 90 until a steady state condition of operation is achieved.

The super-chilled air produced by CTT device 3 (or TT device 51 or two stage CTT device 80) is preferably mixed with ambient air to produce a mass flow of moderately cool air. When reference is made to CTT device 3 hereinafter, it is understood to include TT device 51 and CTT device 80.

Figure 8:
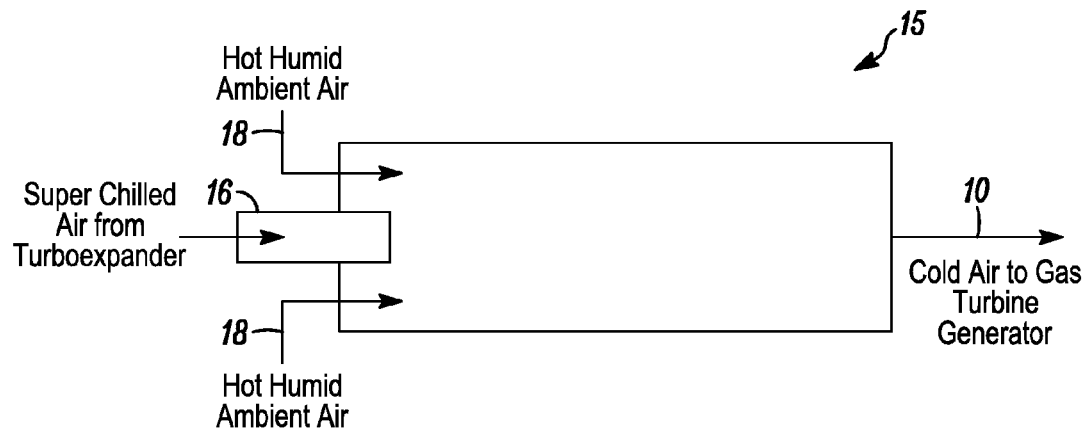
FIG. 8 is a schematic drawing showing various components of the mixing compartment (eductor) that can be used to mix ambient air with super chilled air from the CTT device to produce cool air that can be introduced as the inlet air into the fuel driven turbine generator.

The mixing is preferably accomplished in a mixing compartment such as eductor 15 as shown in FIG. 8. In this respect, the super-chilled air from CTT device 3 is preferably introduced under pressure into eductor 15 through at least one opening 16 wherein the velocity of the super chilled air induces additional ambient air from the outside ambient environment through one or more openings 18 into eductor 15. The two streams of air are then preferably mixed together to produce a single stream of cool air 10 at the required temperature, which can be used as the inlet air in fuel driven turbine generator 23. The temperature of the cool air can be as low as minus 22 degrees F. or lower, although virtually any reduced temperature is contemplated.

Note that the initial temperatures of the two different air flows, and the ratio between them, will determine the output temperature of the cool air. For example, when a greater amount or velocity of super chilled air is available, such as where a larger or more powerful CTT device 3 is used, eductor 15 will likely draw in less ambient air because of the dominance of the super chilled air flow, wherein the resultant air mixture is likely to be colder. On the other hand, when a smaller sized or moderately powerful CTT device 3 is used, or where a lesser amount or velocity of super chilled air is available, eductor 15 will typically draw in more ambient air and the resultant mixture is likely to be less cold. The relative sizes of the openings 16, 18 through which the super-chilled air and ambient air are introduced into eductor 15 can also be a factor, and therefore, the sizes of those openings are preferably predetermined to enable the proper amount and ratio of air and therefore output temperature to be controlled.

Preferably, the proper ratio between the super-chilled air produced by CTT device 3 and the ambient air introduced into eductor 15 is properly controlled to produce the desired temperature of output air that can be used as the inlet air for fuel driven turbine generator 23. Because the temperature of the chilled air can be as low as minus 175 degrees F. or less, and the ambient air temperature can be as high as 100 degrees F. or more, it can be seen that to achieve a consistent temperature, these differences must be taken into account when determining the proper ratio.

Figure 13:
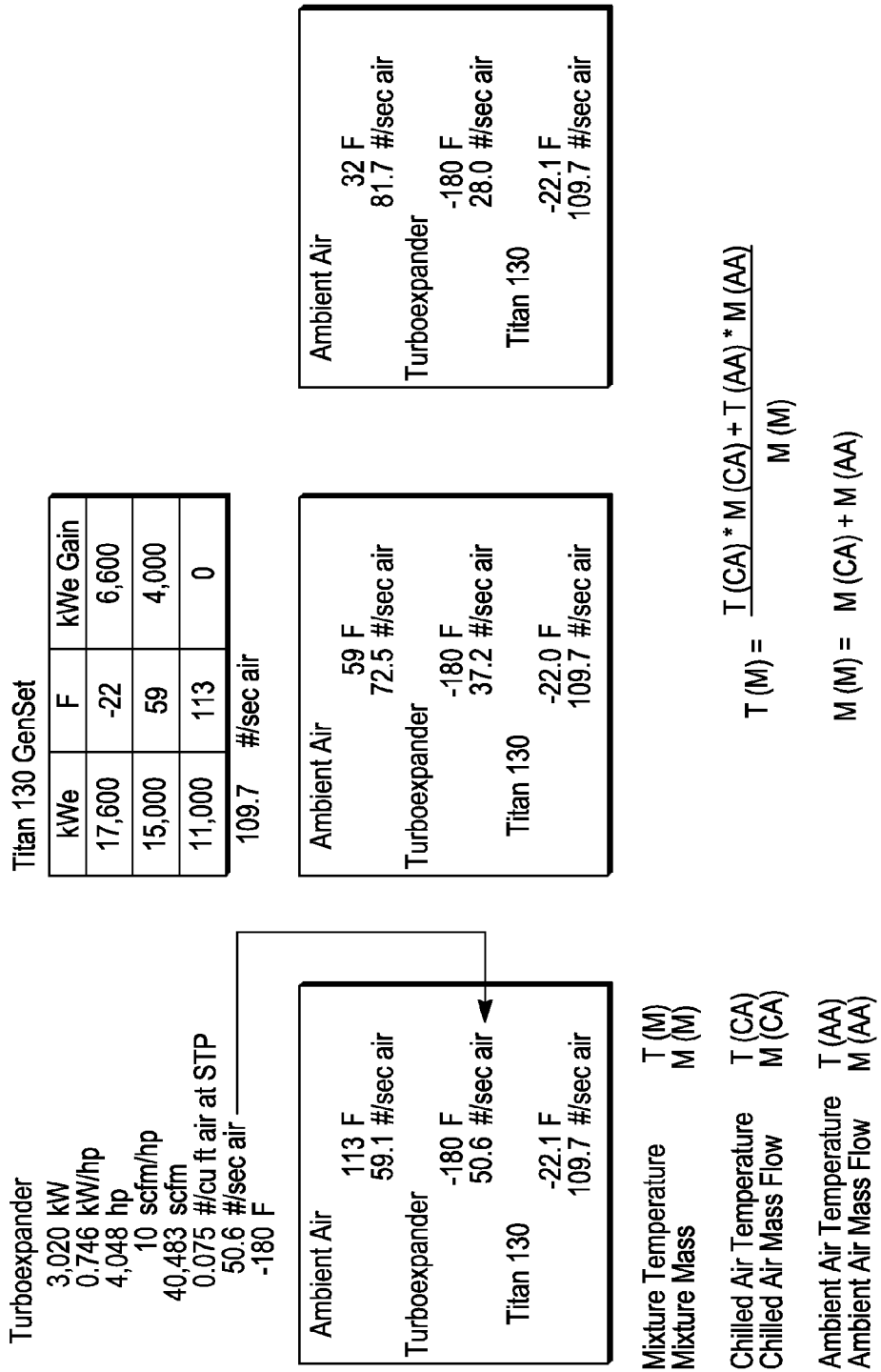
FIG. 13 is a diagram showing the relative mixture ratios for ambient air and super chilled air to produce inlet air of a predetermined temperature using three different turbo expander capacities.

FIG. 13 shows three sample cases wherein the turbo expander is rated at 3,020 kW, 2,200 kW and 1,671 kW, wherein: 1) the 3,020 kW turbo expander produces chilled air at minus 180 degrees F. at a rate of 50.6 #/sec of air; 2) the 2,200 kW turbo expander produces chilled air at minus 180 degrees F. at a rate of 37.2 #/sec of air; and 3) the 1,671 kW turbo expander produces chilled air at minus 180 degrees F. at a rate of 28 #/sec of air. These super chilled air flows can be mixed with warm ambient air to produce relatively cool inlet air at a consistent output temperature of minus 22 degrees F., under the following circumstances: 1) when the ambient air is 113 degrees F., with a flow rate of 59.1 #/sec air, it can be mixed with super chilled air having a flow rate of 50.6 #/sec air, to produce inlet air at minus 22 degrees F. at a rate of 109.7 #/sec air, 2) when the ambient air is 59 degrees F., with a flow rate of 72.5 #/sec air, it can be mixed with super chilled air having a flow rate of 37.2 #/sec air, to produce inlet air at minus 22 degrees F. at a rate of 109.7 #/sec air, and 3) when the ambient air is 32 degrees F., with a flow rate of 81.7 #/sec air, it can be mixed with super chilled air having a flow rate of 28.0 #/sec air, to produce inlet air at minus 22 degrees F. at a rate of 109.7 #/sec air. Note the remarkable enhancement in electric power output of generator set 23 as a function of input air temperature shown in FIG. 14.

While it is desirable to lower the inlet air temperature as much as possible to increase the efficiencies of the system, the problem with past systems has been that when the ambient air includes any moisture, and the temperature of the inlet air drops below freezing, ice particles can form which can cause damage to the turbine blades as discussed above. For this reason, when the ambient air was relatively humid, it was usually necessary to consider the energy requirements for a phase change of the water vapor to ice particles when determining the optimum temperature for the inlet air introduced into fuel driven generator 23. In the past, when the inlet air temperature was reduced to below about 42 degrees F., the restriction of the air flow through the nacelle of the compressor turbine caused the inlet air temperature to drop even further—to below freezing—and therefore, past systems had to avoid inlet air temperatures below 42 degrees F. This limited the extent to which the system could be made more efficient.

In this respect, a related drawback of past systems has been that when a compressor turbine is used to compress the inlet air, it generally accelerated the inlet air through a reduced or constricted cross section air-feed path, which typically resulted in an adiabatic acceleration of the drawn-in air, wherein the acceleration was associated with an enthalpy reduction, which in turn, produced an additional temperature drop. What this means is that while the temperature of the inlet air may have started out above freezing, by the time the inlet air passed through the nacelle and into the compressor turbine, the temperature would drop, such that the eventual temperature of the inlet air entering compressor turbine 25 could cause ice particles to form. Although there are advantages to using cooler air temperatures, as discussed above, the downside is that if the temperature of the inlet air drops too much, ice particles can form, which can not only reduce the power output of the system, but it can also cause damage to the turbine blades, i.e., as the air and ice particles are accelerated through the air-feed system, the ice particles can strike the high speed turbine blades.

Accordingly, in the past, when there was any moisture in the ambient air, the temperature of the inlet air could not be reduced under about 42 degrees F. since otherwise damage to the turbine blades could occur. But in the present case, regardless of whether there is any moisture in the ambient air, the moisture can be removed, as will be discussed, wherein the inlet air temperature can be reduced far below freezing without the risk of causing damage to the turbine blades. Indeed any temperature below 42 degrees F.—wherein the efficiency of fuel driven generator 23 can be enhanced that much more—is feasible. As long as the moisture is removed, virtually any temperature, such as down to minus 22 degrees F. or more, can be used—the lower the temperature the more efficient the system will operate.

Figure 9A:
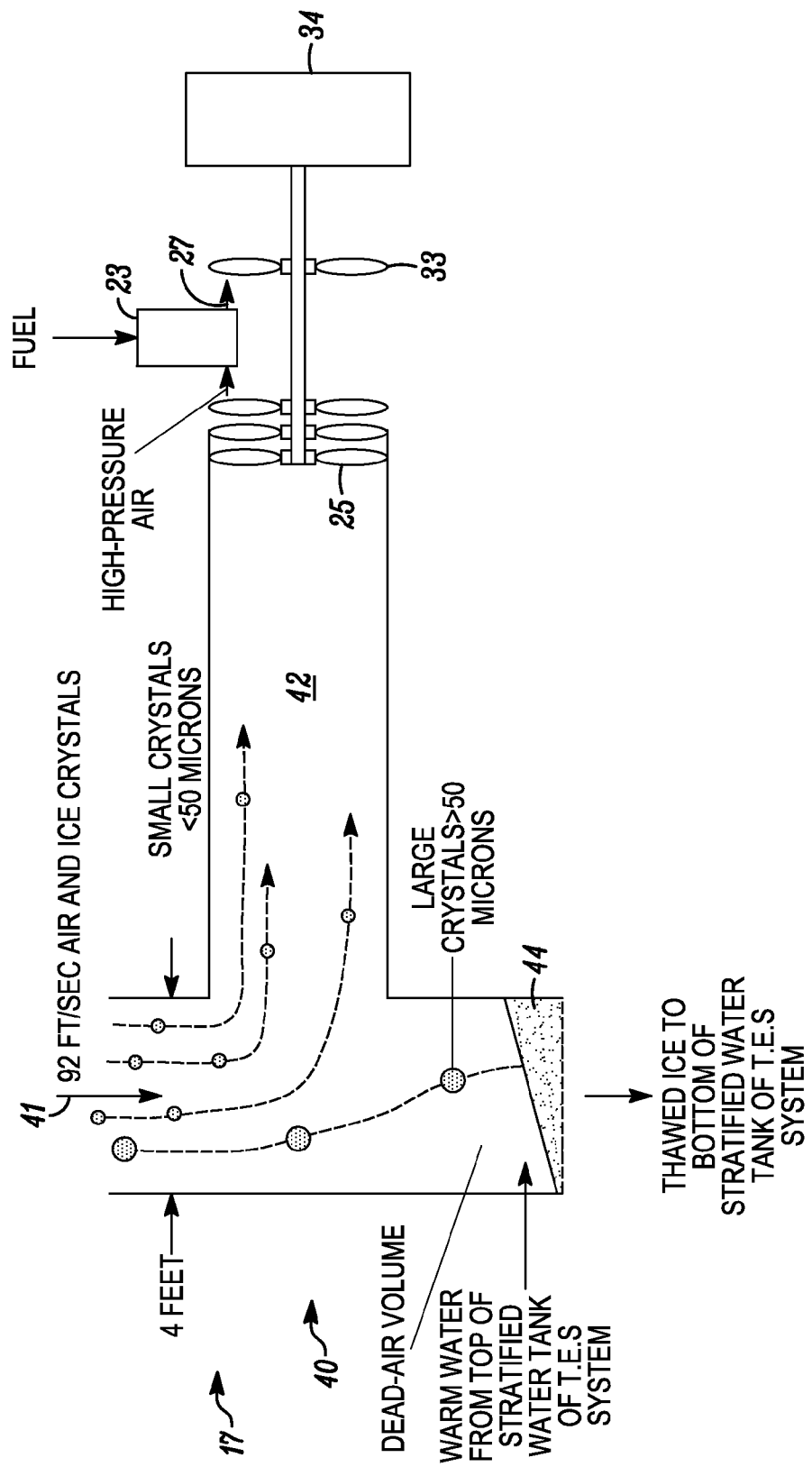
FIG. 9A is another schematic drawing showing components of the separation compartment (centrifuge) that can be used to flash freeze water vapor contained in the ambient air using super chilled air from the CTT device, wherein as the vapor freezes to produce ice particles, the high speed ice particles are allowed to fall to the bottom of the centrifuge by virtue of the inertia thereof, and the cool air is directed through a passageway or side duct extending substantially normal to the compartment, wherein the ice particles can be removed from the chilled air to produce cool "dry" air.

Accordingly, another advantage of the present invention is the use of centrifuge 17 (see FIGS. 9 and 9A) which enables moisture and other particulates to be removed from the inlet air before it is introduced into compressor turbine 25. This way, the formation of ice particles and subsequent damage to the turbine blades can be avoided. This can be done, for example, by configuring cylinder 40 of centrifuge 17 as follows: Cylinder 40 preferably comprises a relatively tall interior profile with a substantially horizontally oriented passageway 42 or duct extending at about ninety degrees relative to the vertical axis of cylinder 40. An inlet 43, as shown in FIG. 9, for the introduction of super-chilled air from CTT device 3 into cylinder 40 is preferably provided at the top, along with one or more additional inlets 45 for the introduction of relatively warm ambient air. Accordingly, as the super chilled air enters into cylinder 40, it can be mixed with the ambient air, to produce a relatively cool inlet air that can be used as the inlet air for fuel driven generator set 23. But as the moisture within the ambient air is exposed to the super chilled air, the water vapor contained therein flash freezes to form ice particles which can then drop down in the high speed vertical air flow within cylinder 40, wherein typically the larger ice particles (such as greater than 10 to 20 microns in diameter) are heavy enough to fall to the bottom of cylinder 40 by virtue of their inertia, whereas, the resultant cool dry air 41 (potentially laden with ice particles less than 10 to 20 microns in diameter) is light enough to turn the corner and be directed into duct or passageway 42 and preferably away from CTT device 3. The ice particles in the high speed air stream continue their vertical trajectory downward because of their inertia compared to the sideward local aerodynamic drag forces induced by the corner turn leading into horizontal passageway or branch duct 42. Preferably, duct extension 42 is a passageway with a relatively sharp turn, such as at ninety degrees relative to the axis of cylinder 40, so that the frozen ice particles can settle at the bottom 44 of cylinder 40, and the cool dry air with only minimal ice will turn the corner 41 and be directed through duct extension 42 and then on to fuel driven generator set 23.

It has been found that ice particles that are greater in size than about 10 to 20 microns are typically not able to make the 90-degree turn within centrifuge 17 and wind up continuing down at relatively high speeds to bottom 44, whereas, ice particles that are smaller than about 10 microns may end up getting blown with the cool air and make the corner and flow into extension 42. Although some of the smaller ice particles may not have enough mass to resist being turned, these tend to be relatively small such that they will not cause damage to the turbine blades.

For example, when the ambient air begins at a humidity of one hundred percent, which can typically contain about 0.030 pounds of water per pound of air, after the ambient air has been processed through cylinder 40, the total amount of water contained within the resultant cool dry air may only be 0.001 pounds of water per pound of air, which is a significant reduction.

Once the ice particles amass at bottom 44 of cylinder 40, they can be collected and thawed to produce chilled water that can be stored and used in an associated thermal energy storage system 21, wherein the chilled water that results can be used to provide cooling for HVAC, refrigeration, desalination, or the like, etc.

The above process advantageously allows the inlet air into fuel driven turbine generator 23 to be substantially cooled and dried and particulate free. By cooling the inlet air, the air introduced into compressor turbine 25 is denser and has greater air mass so that compressor turbine 25 will require less work to compress the inlet air into combustion chamber 27. By removing the moisture and particulates from the inlet air, and therefore, preventing ice particles from forming and damaging the turbine blades 29, 31, compressor turbine 25 can be operated at full capacity, notwithstanding that the temperature of the inlet air can be reduced to well below freezing, thereby improving the efficiencies of the overall system.

The decision whether to use centrifuge 17 is typically made depending on the desired temperature of the inlet air, wherein anytime the inlet air temperature is reduced to 42 degrees F. or lower, centrifuge 17 should be used. This is because as discussed above even if the inlet air temperature does not start out below freezing, as the inlet air is accelerated through the nacelle of the compressor turbine, the temperature of the inlet air can drop, in which case, the result could be that ice particles can form that can damage the turbine blades. On the other hand, when the inlet air temperature is higher than 42 degrees F., it can be seen that there may be no need for centrifuge 17, insofar as there may be little chance that water vapor will freeze, notwithstanding the enthalpy that occurs as the air is accelerated through the nacelle. When the ambient air is already dry, such as in arctic conditions, the likelihood of forming ice particles that can cause damage to the turbine blades is likewise reduced.

Note that the function of eductor 15 and centrifuge 17 can be incorporated into a single device, such as a separation compartment, wherein the chilled air and ambient air can be introduced and mixed together in the cylinder portion, and the ice particles can then fall to the bottom, and wherein the resultant cool air can then be channeled through a side duct or passageway. Accordingly, when referring to centrifuge 17 throughout this discussion, it is understood that centrifuge 17 could also incorporate the mixing capabilities of eductor 15, i.e., in a single unit/device.

Based on the above, it can be seen that CTT device 3 (or TT device 51 or CTT device 80) can perform at least the following important tasks: 1) generate a high mass flow of superchilled air that can be combined with warm ambient air to produce a mixture of relatively cool air that can be used as the inlet air in fuel driven turbine generator 23, 2) generate heated coolant water via one or more compressors and one or more heat exchangers that can be used in an associated steam turbine generator 19 to increase the efficiency thereof and/or an absorption chiller system 130, 3) provide chilled water that can be introduced into thermal energy storage system 21 and then used to provide cooling for HVAC, refrigeration, desalination or the like, etc., and 4) remove ice particles and other particulates from the intake air which allows the inlet air temperature to be reduced well below freezing without causing damage to the turbine blades, wherein by using cooler inlet air, the system can be made more efficient.

2. Steam Turbine Generator:

Steam turbine generator 19 preferably comprises boiler 20 with a heat source 23 wherein the heated coolant water expelled from CTT device 3 can be introduced into boiler 20 and heated and boiled to produce steam. Because the coolant water is preheated by heat exchange within CTT device 3, less energy will be required to boil the water in boiler 20 and produce steam. For example, in a typical CTT device 3, heat exchangers 7, 11 could be used to increase the temperature of the coolant water from an ambient temperature of say, 70 degrees F., to a higher temperature of say, 180 degrees F. or more, wherein less energy would then be required to raise the temperature of the water to boiling.

The steam produced by boiler 20 preferably causes steam turbine 22 with blades 24 to begin rotating which in turn causes shaft 26 that steam turbine 22 is located on to spin as well. Because shaft 26 is connected to generator 28 along with coils 30 and magnets 32, as steam turbine 22 begins to spin, generator 28 also begins to rotate and produce electricity. Because water from heat exchangers 7, 11 is heated before it enters boiler 20, steam turbine generator 19 requires less energy to boil the water, wherein the system is made more efficient. The electricity produced by steam turbine generator 19 can be combined with electricity produced by fuel driven generator 23, or can be distributed to its own facility, wherein the overall efficiencies can be increased.

3. Thermal Energy Storage System:

The ice particles that are produced by CTT device 3 and separated from the cool dry inlet air by centrifuge 17 can be collected and thawed to produce chilled water that can be stored in associated thermal energy storage system 21, wherein the chilled water that results can be used to provide cooling for HVAC, refrigeration, desalination, or the like, etc. Thermal energy storage system 21 preferably includes stratification tank 60, as shown in FIG. 10, which is preferably a tall cylindrical tank 62 that contains a body of water that is stratified and contains relatively warm water at the top and relatively cold water at the bottom, with a density interface in between. Preferably, there is an inlet 64 for chilled water from centrifuge 17 and an outlet 66 for chilled water from tank 62 to an associated device, such as an HVAC, at the bottom, and an inlet 68 for warm water from the associated device at the top of tank 62. Another outlet can be provided to make room for more cold water if necessary.

These features relating to the thermal energy storage system are discussed in more detail in Applicants' patent application Ser. No. 11/585,023, entitled "THERMAL ENERGY STORAGE SYSTEM USING COMPRESSED AIR ENERGY AND/OR CHILLED WATER FROM DESALINATION PROCESSES," which is incorporated herein by reference.

The chilled water can also be used directly to provide cooling for HVAC, refrigeration, desalination, or the like, etc., without having to store the chilled water in thermal energy storage system 21 first. In such case, thermal energy storage system 21 can be eliminated and the ice particles that are collected at the bottom 44 of centrifuge 17 can be thawed, wherein the chilled water produced as the ice particles melt can then be distributed to the associated devices directly.

Also, in another embodiment, the super chilled air produced by CTT device 3 can be directed toward thermal energy system 21 and used to facilitate the chilling of the storage water before or after it is sent to eductor 15. Likewise, when cool enough, some of the cool dry air from CTT device 3 can be directed to an air/water heat exchanger associated with thermal energy storage system 21 to provide cooling.

4. Absorption Chillers:

In a chilled water air conditioning system, cold water preferably flows through the coil that cools the air. The air conditioner that cools the water is called a chiller. Chillers are typically located in a dedicated machinery area somewhere in the same building, on the roof, or outside, etc., as the area serviced by the chiller. In the chiller, refrigerant preferably flows through the coil that cools the water, and then, the chilled water is then pumped through a piping loop to air handlers located in the spaces to be cooled, wherein it absorbs heat from the air that flows over the air handling coil.

In the case of absorption chillers, as shown in FIG. 17, rather than using a mechanical compressor to drive a vapor compression cycle, absorption chillers 130 preferably uses a thermo chemical compressor 132. In this respect, the thermo chemical process preferably takes advantage of the fact that some chemicals tend to dissolve into other chemicals—a property chemists call "affinity"—and in such case, an absorption cycle typically uses two fluids: a refrigerant and an absorbent.

In contrast to the compression that takes place in a conventional chiller, the refrigerant in an absorption chiller dissolves into an absorbent solution for which it has a high affinity. Two common refrigerant/absorbent combinations are water and lithium bromide, on one hand, and ammonia and water, on the other. The refrigerant changes phase and preferably circulates through the entire system. An electric pump is preferably provided to move the absorbent solution into a generator, wherein heat is applied to drive the refrigerant vapor out of the solution and into evaporator 134. Substituting thermal energy for mechanical compression means that absorption chillers use much less electricity than mechanical compressor chillers. Accordingly, absorption chillers are cost-effective when the thermal energy they consume is less expensive than the electricity that is displaced. In the present case, the heat used for the absorption chiller is derived from the heat generated by the CTT device heat exchangers.

Absorption chillers can be direct or indirect-fired and single or multiple-effect. Direct-fired chillers contain a burner that runs on natural gas or another fuel to produce the heat required for the absorption process. Indirect-fired chillers use steam or hot water produced externally by a boiler or cogeneration system. A system of piping and heat exchangers transfers the heat to the chiller.

Single-effect absorption chillers use thermal energy to drive a single refrigeration cycle. Multiple-effect absorption chillers use two or more refrigeration cycles: The first is driven by high-temperature thermal energy, and the second and subsequent stages are driven by lower-temperature energy rejected by the previous cycle's condenser. Multiple-effect chillers are more efficient than single-effect chillers, but they require a much hotter source of thermal energy. Single-effect chillers may be driven by hot water ranging from 160 to 200 degrees F., but double-effect chillers require either direct heat from a gas flame or high-pressure steam. Double-effect chillers are much more expensive usually at least double the initial cost. The most commonly used absorption chillers are of the single-effect, indirect-fired variety, primarily because of the lower cost.

5. Fuel Driven Turbine Generator Set:

At lower and lower intake air temperatures, fuel driven turbine generators produce more electricity for the same fuel consumption. Tests have shown that the power output and efficiency of fuel driven turbine plants are heavily dependent on the temperature of the inlet air. For example, at high ambient inlet air temperatures, a power loss of more than 20%, combined with a significant increase in fuel consumption, compared to ISO standard conditions (15° C. or 59° F.), have been observed.

For these reasons, CTT device 3 (or TT device 51 or two stage device 80) of the present invention have been incorporated into the system to efficiently produce cool dry inlet air that can be introduced into fuel driven turbine generator 23 to increase its efficiency. But unlike the cool air produced by past fuel driven turbine systems, the cool inlet air produced by the present invention preferably enables the air to be dried before it enters into fuel driven turbine generator 23. That is, in the present invention, one of the benefits provided by centrifuge 17 is that it produces cool "dry" inlet air that can be introduced into compressor turbine 25 at well below freezing without negative consequences. That is, without moisture and particulates in the inlet air, no significant ice particles will form that can cause damage to the compressor turbine blades 29.

Figure 5:
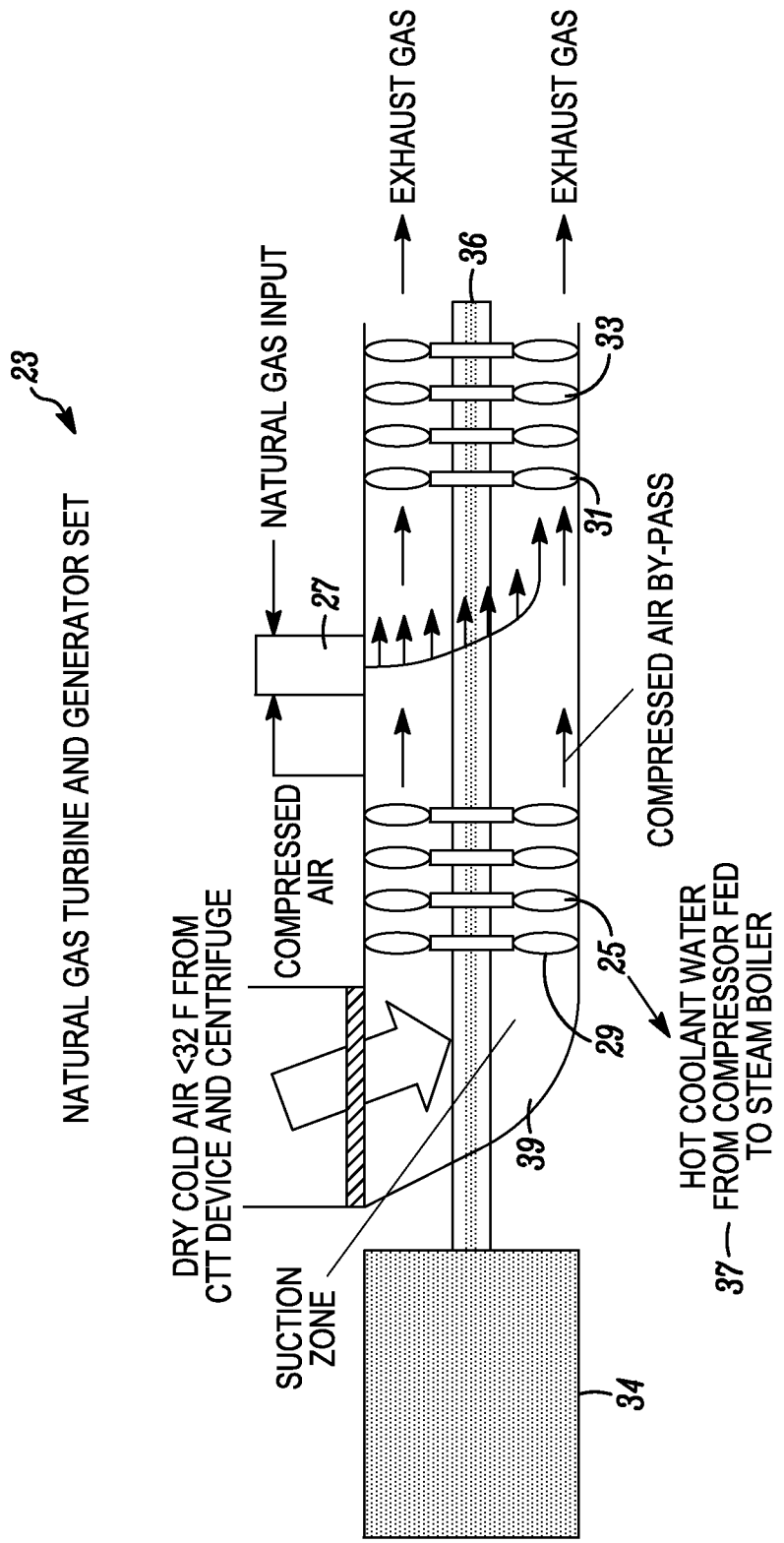
FIG. 5 is a schematic drawing showing various components of the fuel driven turbine generator set including the compressor turbine, combustion chamber, expansion turbine and electrical power generator.

As shown in FIG. 5, fuel driven turbine generator 23 preferably comprises compressor turbine 25 capable of being driven by a separate power source. Accordingly, compressor turbine 25 can begin to rotate first, wherein the cool dry inlet air from centrifuge 17 (or the cool air from eductor 15) can be accelerated through nacelle 39 in which compressor turbine 25 is located. In this respect, when the temperature of the inlet air is below or close to freezing, it is important to remove moisture and particulates from the inlet air, whereas, if the temperature of the inlet air is above 42 degrees F., no centrifuge 17 may be needed. It can be seen that the present invention contemplates that the system can be designed so that the inlet air can be reduced to far below freezing temperatures, i.e., below minus 22 degrees F., and accelerated through nacelle 39 at substantial velocities, i.e., over 300 feet per second, wherein the efficiencies of the overall system can be significantly improved.

Compressor turbine 25 preferably compresses the cool dry air and introduces it into combustion chamber 27 where it can be mixed with compressed fuel vapor and combusted. By compressing the cool dry air into combustion chamber 27, and then compressing fuel vapor into combustion chamber 27, the air and fuel vapor can be mixed together and burned to produce energy more efficiently. The ratio of the air and fuel mixture within combustion chamber 27 is preferably predetermined and remains constant to ensure that the maximum energy output is produced as the fuel is burned.

The optimum combustion temperature in this respect is about 3,500 degrees F. when the stoichiometric mixture of air to fuel is used, which for many fuels, is around Air/Fuel=15. There are two issues involved in connection with these factors: (1) The temperature limit of the combustion turbine expander material is often limited to 2,500 degrees F., and (2) the high temperature produces combinations of nitrogen and oxygen (NOx) that are pollutants. Thus there has been considerable effort made in developing higher temperature materials and introducing cool blades. There have also been many approaches to reducing the temperature of the combustion products prior to their impingement on the turbine blades by using bypass compressed air for cooling—see FIG. 5. Others found that injecting steam achieves these goals of lower temperatures and less pollutant gases with enhanced power output. In the present case, when starting with a large mass flow of air at a low temperature of say, minus 22 degrees F., rather than plus 113 degrees F. (extreme), a lower final combustion temperature can be achieved.

Too much fuel and not enough air or too much air and not enough fuel within the mixture can cause the system to work inefficiently. Likewise, because in the preferred embodiment, the cool air is dry, there is no need for any additional warming or heating devices and therefore there are no additional costs or pressure losses associated with these components, nor is there additional heating of the inlet air when ice formation is anticipated. For the above reasons, with the present system, the temperature of the inlet air being fed into compressor turbine 25 can be well below freezing, i.e., as cold as desired, wherein the colder the inlet air temperature is, the more efficient fuel driven turbine generator 23 will be.

The expansion energy created by the combustion of the fuel is preferably released from combustion chamber 27 and used to drive an expansion turbine 33 with blades 31. Expansion turbine 33, compressor turbine 25 and electrical power generator 34 are preferably located on the same shaft 36, and therefore, as expansion turbine 33 rotates, both compressor turbine 25 and electric generator 34 are also driven and powered to produce electricity. Thus, the common shaft 36 of fuel driven turbine generator 23 will eventually allow compressor turbine 25 and expansion turbine 33 to reach a steady state condition of operation, wherein the combustion of the fuel in combustion chamber 27 will assist in keeping compressor turbine 25, expansion turbine 33 and generator 34 rotating and operating as well.

The heat generated by compressor turbine 25 can be withdrawn and transferred via a coolant running through a heat exchanger 37 associated with fuel driven turbine generator 23 which can be transferred to steam turbine generator 19 via the heated coolant or chiller 130. That is, heat exchanger 37 can be similar to heat exchangers 7, 11 which is capable of transferring heat to a coolant water. This way, as the compressed air is heated, heat exchanger 37 will be able to produce additional heat that can be introduced into boiler 20 of steam turbine generator 19 and/or absorption chiller 130. Like other heat exchangers 7, 11, heat exchanger 37 is preferably any conventional type such as a counter current type that uses coolant water to draw heat away from compressor turbine 25 (and the compressed air that it produces). The compressed air bypass is shown mixing with the hot combustion product (3,500 degrees F.) to reduce the impingement of gases above 2,500 degrees F. on the water cooled turbine blades.

6. Sample System

An example of how the present invention can be used to increase the efficiencies of a fuel driven turbine power plant is shown below. The criteria for a typical power plant supplying electrical power to a facility are described by the following performance parameters:

| Facility elevation | 400 Feet above sea level |
|---|---|
| Peak Load: | 40 MW |
| Gas Turbines: | 2 × 13.5 MW |
| Steam Turbine: | 1 × 3 MW |
| Total: | 30 MW |

-continued

| Base Load for facility: | 28 MW |
|---|---|
| 3 turbines: | 3 × 400,000 Pounds of air per hour |

The objective of this effort is to consider a CTT device 3 as a means of enhancing the efficiency and performance of a fuel driven turbine generator set 23 by generating highly chilled air at about minus 174 degrees F., which can then be mixed with ambient air, of say, 86 degrees F., to produce inlet air at a temperature of about 59 degrees F. which can be introduced into fuel driven turbine generator 23.

Figure 11:
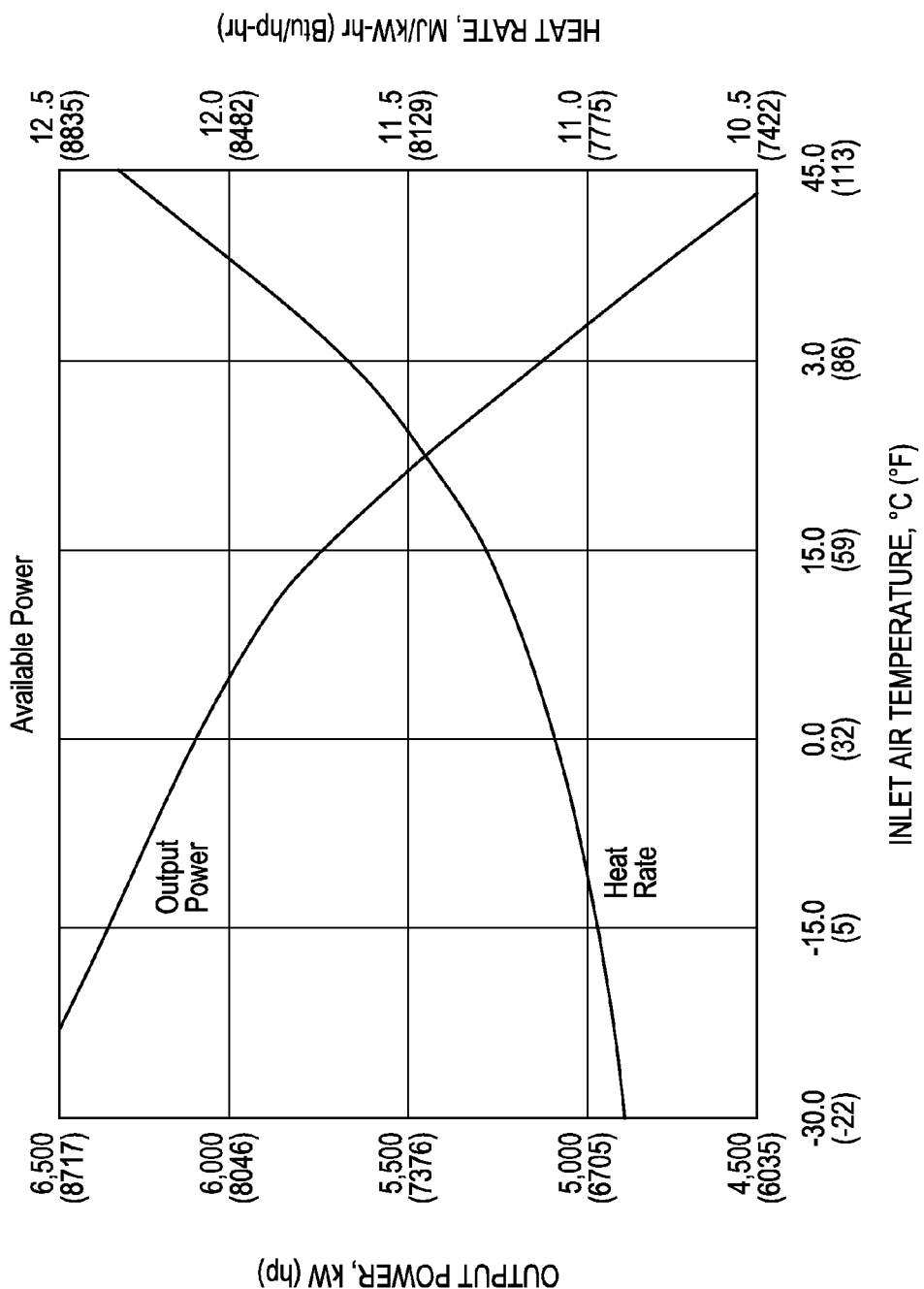
FIG. 11 is a power chart showing a comparison between the output power that can be generated by the fuel driven turbine generator relative to the various inlet air temperatures introduced into the compressor turbine.

FIG. 11 shows the performance sensitivity of a Solar Turbine (A Caterpillar Company) Taurus 60 Gas Compressor turbine relative to inlet air temperature. When the temperature of the inlet air is not reduced, but rather, remains at an ambient temperature of say, 86 degrees F., it can be seen that the power output is about 5,100 kW. On the other hand, when the temperature of the inlet air is reduced by 27 degrees F., to say, 59 degrees F., the power output is increased to about 5,740 kW, which is a difference of 640 kW, which occurs without increasing fuel consumption.

The inlet air in this case has a relative humidity of 60% and the airflow is 47.6 pounds per second, which are both acceptable. And since the inlet air temperature is not close to freezing, there is no risk that ice particles will form as the inlet air is accelerated through nacelle 39. Accordingly, in this example, there is about a 640 kW difference or improvement in power output that results from using inlet air that is 27 degrees F. lower in temperature, i.e., when the inlet air temperature is changed from 86 degrees F. to 59 degrees F. FIG. 11 shows a linear increase of power output between 113° F. and 59° F.

Likewise, by dropping the temperature of the inlet air by an additional 27 degrees F., i.e., down to about 32 degrees F., there would be an additional power output produced by the system of about 400 kW (See FIG. 11), wherein the total increase in power produced by reducing the inlet air temperature by 54 degrees F. would be about 1,040 kW. This can be achieved by decreasing the inlet air temperature from the ambient temperature of 86 degrees F. down to 32 degrees F. This can also be achieved without having to consume more fuel. But in this case, because the inlet air temperature is close to freezing, and the acceleration of the inlet air through nacelle 39 is likely to cause the water vapor within the inlet air to freeze and form ice particles, there is an additional concern that some of the ice particles will cause damage to the compressor 29 and expansion turbine blades 31, as well as create other inefficiencies in the system. Accordingly, in this example, it would be highly desirable and advisable to incorporate centrifuge 17 to remove moisture and therefore ice particles from the inlet air before it enters into compressor turbine 25.

As mentioned, this example assumes that the inlet air has a 60% relative humidity, wherein the benefits of the present invention can be shown when one considers that the water vapor in the inlet air could, if it were allowed to remain, freeze and turn into ice particles that could cause damage to the turbine blades 29. But in this case, the processes that are implemented by centrifuge 17 can help to freeze the water vapor and remove the ice particles and solid particulates from the inlet air, prior to introducing the air into compressor turbine 25. Essentially, the removal of the water vapor occurs at three locations: (1) in condensation after compressor 5 compresses the ambient air wherein the resultant heated air produced by compressor 5 is cooled by heat exchanger 7, (2)

in condensation after turbo compressor 9 compresses the ambient air wherein the resultant heated air produced by turbo compressor 9 is cooled by heat exchanger 11, and (3) in ice crystallization after the ambient air is chilled within eductor 15 and passed through centrifuge 17.

In this respect, it can be seen that it is vital to remove the ice particles within the inlet air prior to transmitting and accelerating the inlet air to compressor turbine 25 when the inlet temperature is below about 42 degrees F. because the acceleration of the inlet air through nacelle 39 can reduce the temperature of the air by an additional 8 to 10 degrees F. And if ice particles are formed, and they travel at high velocities through nacelle 39, they are likely to strike the turbine blades 29, 31 and cause damage thereto. Centrifuge 17 readily achieves the objective of removing ice particles and other particulates within the inlet air by means of a downstream cylinder 40 that has a straight downward path line 41 for the ice particles and a ninety degree turn with a duct 42 for the cooled air that can be channeled to the fuel driven turbine generator 23 intake.

Thereafter, the ice particles can be permitted to thaw within the bottom of the vertical duct (dead-water volume) of centrifuge 17, and stored at the bottom of nearby water stratification tank 62 of thermal energy storage system 21, which represents additional energy recovery. The solid particles trapped within the ice particles can also be removed from the intake air by causing the water vapor within the ambient air to freeze, wherein the particles are generally trapped within the water vapor and therefore are allowed to freeze. Thus, by removing the ice particles, most if not all of the solid particles can also be removed from the cool dry air. This way, the need for filtering the inlet air to remove salts and other solids typically present in seaside air is reduced or eliminated altogether. This also advantageously removes salts from the cool air which are one of the causes of corrosion and undesired buildup on turbine blades 29, 31.

Through this process, once the ice and solid particulates are removed from the inlet air, the temperature of the intake air can be reduced to temperatures far below 32 degrees F., which can further increase the efficiency of the system without increasing fuel consumption, and without the risk of damage to turbine blades 29, 31. For example, if the inlet air temperature is reduced by another 27 degrees F., such as down to 5 degrees F., the total amount of power produced, without increasing fuel consumption, can be increased by another 300 kW (See FIG. 11), or a total of 1,340 kW. Likewise, if the inlet air temperature is reduced even further, such as down to minus 22 degrees F., the total power output could be increased by another 260 kW, or a total of 1,600 kW, again without increasing fuel consumption.

Another energy saving component of the present invention relates to the use of heat produced by the compressors (and other components) which can be transferred via heat exchangers and coolant water to steam turbine generator 19, wherein the heated coolant water can be used to supply preheated water to boiler 20 to improve system efficiency, or can be used to supply preheated water to an absorption chiller 130. In this case, the heat energy transferred to the coolant water is preferably derived from the approximately 85% efficiency of each compressor, as well as a conversion of about one kW output for each one kW input. In this respect, it can be seen that FIG. 14 uses the performance curve derived from the data in FIG. 12B and the information in FIG. 13 to demonstrate that the recovery of all the rejected heat and the enhanced performance of fuel driven generator 23 in this example yields an incredible total power recovery of 14,914 kW, compared to the power input of 3,917 kW, wherein the power output to power input ratio is as high as 3.81 (14,914 kW divided by 3,917 kW). In these examples, the fuel driven generator set used is the Titan 130, and the ambient air temperature is 113 degrees F. and the inlet air temperature is minus 22 degrees F.

The ice crystals sent to the bottom of stratified water tank 60 used for the Thermal Energy Storage (TES) system presents another energy savings. FIG. 15, however, shows that the energy recovery from thawing the ice and transferring the resultant cold water to TES is not a large percentage of the power savings. In fact, the energy loss in freezing the water vapor in the air is balanced by the energy gain in the TES system, except that there is an added advantage to the energy storage aspect.

The technical approach involved herein considers the synergistic effect of combining the following elements:
  Compressor, Turbo Compressor and Turbo Expander (CTT) Device
  Eductor and Centrifuge
  Thermal Energy Storage system
  Air/Water Heat Exchangers and Steam Turbine Generator system
  Fuel Driven Turbine and Generator Set
  Chiller The net effect of combining these elements is not only an increase in power output created by lowering the temperature of the inlet air to the fuel driven turbine generator, but there is also a net reduction in consumed power, in that heat rejection from the air compression processes is transmitted to the coolant water (as in the case of a heat pump) and the resultant hot water is used as input to steam turbine generator 19 or chiller 130, thus enhancing their efficiencies. In addition, more electrical power is generated for the same fuel consumption by the fuel driven turbine generator because of the reduced inlet air temperature and moisture free inlet air that is introduced into compressor turbine 25. The CTT device generates both superchilled air and hot water that are used at different points in the overall process for increased efficiencies.

When comparing the present invention with other types of cooling systems, it can be seen that the present invention is far superior particularly on account of the ability of the system to reduce the inlet air temperatures to far below freezing without the attendant risks of damaging the turbine blades. With fogging, high pressure fogging, wet compression and evaporative coolers, for example, where the ambient temperature is 86 degrees F., the inlet air temperature cannot be reduced much below 60 or 70 degrees F., and therefore, they would provide only a limited increase in efficiency and only a limited amount of extra power. With other types of cooling systems that are capable of reducing the air temperatures to below freezing, such as mechanical and absorptive coolers, there is the additional problem of ice particles being formed and particulates being present that can damage the turbine blades, and therefore, even if they could reduce the inlet air temperature by a comparable amount, the disadvantage would be that they would cause permanent damage to the equipment. Or if a heater is used to prevent the formation of ice particles, additional system inefficiencies would be introduced. Another disadvantage of many of these conventional cooling systems is the need to use chemical refrigerants such as ammonia, lithium bromide and Freon which can represent an environmental hazard. A comparably sized and powered air conditioning system that would be able to reduce the inlet air temperature in a manner comparable to that of CTT device 3 would have to comprise a vacuum and complex plumbing and toxic chemicals.

Figure 16:
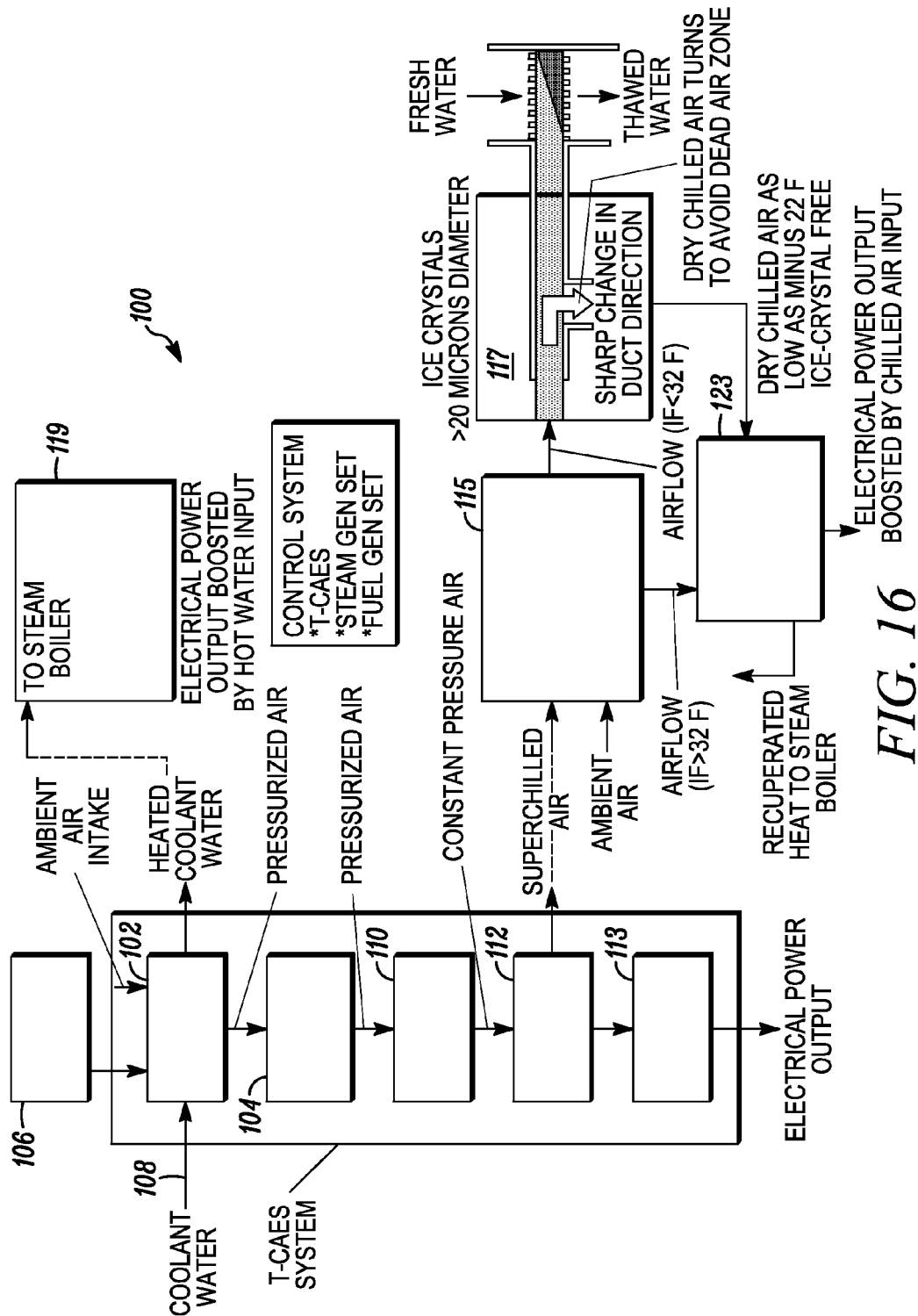
FIG. 16 is a schematic drawing showing an alternate embodiment wherein compressed air is stored in a high pressure vessel during off-peak hours and released during peak hours to drive a turbo expander that produces super chilled air.

7. Alternate Embodiment with Storage Tank:

In another embodiment 100, as shown in FIG. 16, a compressor 102 can be used to pressurize a storage tank or high pressure vessel 104 which can be an underground cavern or pipeline such as during off-peak hours (usually nighttime) when energy costs are relatively low. Then, during the peak hours (such as during daytime) the compressed air can be discharged from storage tank 104 to produce super-chilled air that can be mixed with ambient air and introduced into fuel driven generator set 123.

In this case, an electrical power source 106 is preferably provided to drive compressor 102. Coolant water 108 can also be passed through compressor 102 to reduce the temperature of the compressed air, wherein heated coolant water can be distributed to steam driven generator 119 or chiller 130. Steam driven generator 119 is substantially similar to steam driven generator 19, wherein generator 119 has a boiler and steam generator turbine that drives an electric generator.

Storage tank 104 is preferably similar to a compressed air energy storage system like those described in applicant's previous applications, such as U.S. Pat. No. 7,067,937, which is incorporated herein by reference. It can also be an underground cavern or pipeline. A control valve 110 is preferably provided which controls the release of the compressed air at the appropriate time, as well as controls steam generator 119, and fuel driven generator 123, etc.

Turbo expander 112 is preferably provided which can release and expand the compressed air energy stored in storage tank 104 or other pressure vessel. The discharged compressed air from storage tank 104 is preferably used to generate super chilled air which can be introduced into inductor 115, similar to eductor 15, wherein the super chilled air can be mixed with ambient air to produce a relatively cool inlet air for introduction into fuel driven generator 123. Turbo expander 112 can also be connected to a generator 113 which can be used to generate electricity directly.

As the super chilled air is introduced into inductor 115, it is preferably allowed to mix with the ambient air, similar to eductor 15. The relatively cool inlet air can then be introduced directly into fuel driven generator 123, such as when the air is already dry, or when the inlet air temperature is not below about 42 degrees F. Alternatively, the cool air from inductor 115 can be introduced into centrifuge 117, such as when there is moisture or humidity in the ambient air, or when the inlet air temperature falls below 42 degrees F. Within centrifuge 117, the water vapor within the ambient air can be flash frozen, and due to the configuration of centrifuge 117, which is similar to centrifuge 17, the larger ice particles that are formed (such as those that are 10 to 20 microns or bigger) can fall to the bottom/end thereof, i.e., through greater inertia, and the lighter cool air will turn the corner and pass through a side passageway or duct extending normal to the axis of centrifuge 117, thereby helping to remove the ice particles from the air. In either case, the cool dry air is then introduced into fuel driven generator 123, as discussed previously, and used as the inlet air for the compressor turbine, which helps to increase the efficiency thereof. Various heat exchangers are contemplated and can be used to transfer heated coolant water to steam generator 119.

What is claimed is:

1. A system for enhancing the efficiency of a fuel driven turbine generator, comprising:
   a device having a turbo compressor and turbo expander capable of producing chilled air;
   a compartment for mixing the chilled air produced by said device with ambient air to produce cool air, wherein moisture is removed from the cool air by causing water vapor therein to flash freeze into small ice particles as the ambient air is mixed with the chilled air, and the ice particles separated from the cool air within said compartment;
   a compressor turbine coupled with said compartment and adapted to compress and introduce the cool air into a combustion chamber; and
   an expansion turbine adapted to be powered by burning fuel vapor within said combustion chamber, wherein said expansion turbine is connected to an electric generator capable of generating electricity.

2. The system of claim 1, further comprising at least one heat exchanger for cooling said turbo compressor, and transferring heat generated by said turbo compressor to a coolant and directing the coolant into a steam driven turbine generator and/or a chiller.

3. The system of claim 1, further comprising a compressor in association with said device for initially compressing the ambient air, wherein said turbo compressor and said turbo expander are arranged on a common shaft, and initiating rotation of said turbo expander with said compressor causes said turbo compressor and said turbo expander to rotate until a steady state condition of operation is achieved.

4. The system of claim 3, further comprising at least one heat exchanger to draw heat away from said device, wherein said at least one heat exchanger transfers heat generated by said device to a coolant and directs the coolant into a boiler of a steam driven turbine generator and/or a chiller.

5. The system of claim 1, wherein the ice particles are separated from the cool air within said compartment by allowing the ice particles to fall within said compartment and allowing the cool air to flow through a passageway and be separated from the ice particles.

6. The system of claim 5, wherein the passageway extends substantially normal to said compartment and allows only the cool air to escape from said compartment, while leaving the ice particles to fall to a bottom of said compartment.

7. The system of claim 6, wherein the ice particles are melted in said compartment and chilled water formed thereby is introduced into a thermal energy storage system associated with said compartment, and/or used to provide cooling for HVAC, refrigeration, or desalination.

8. The system of claim 1, further comprising placing said compressor turbine, expansion turbine and electric generator on a common shaft, wherein by causing said expansion turbine to rotate, said compressor turbine and said electric generator are rotated until a steady state condition of operation is achieved, wherein by introducing the cool air into said compressor turbine, work needed to compress and introduce compressed air into said combustion chamber is substantially reduced, wherein more energy is then made available to drive said electric generator, thereby increasing the efficiency of said fuel driven turbine generator.

9. The system of claim 1, further comprising a two stage turbo compressor and two stage turbo expander device to increase and decrease the pressure within said device more gradually.

10. An apparatus for enhancing the efficiency of a fuel driven turbine generator, comprising:
    a device having a turbo compressor and turbo expander capable of producing chilled air;
    a compartment for mixing the chilled air produced by said device with ambient air to produce cool air and frozen ice particles, wherein a passageway extending substantially normal to a vertical axis of said compartment is provided through which the cool air substantially exits, wherein the ice particles within said compartment are allowed to fall within said compartment and collect therein;

a compressor turbine that is part of said fuel driven turbine generator coupled to said compartment and adapted to compress the cool air produced in said compartment and introduce the cool air under pressure into a combustion chamber to be mixed with fuel vapor; and an expansion turbine adapted to be powered by burning fuel vapor in said combustion chamber, wherein said expansion turbine is connected to an electric generator capable of generating electricity.

\* \* \* \* \*